(12) United States Patent
Monica et al.

(10) Patent No.: US 11,438,174 B2
(45) Date of Patent: *Sep. 6, 2022

(54) CRYPTOASSET CUSTODIAL SYSTEM WITH DIFFERENT CRYPTOGRAPHIC KEYS CONTROLLING ACCESS TO SEPARATE GROUPS OF PRIVATE KEYS

(71) Applicant: Anchor Labs, Inc., San Francisco, CA (US)

(72) Inventors: Diogo Monica, San Francisco, CA (US); Nathan P. McCauley, San Francisco, CA (US); Riyaz D. Faizullabhoy, Los Altos, CA (US); Boaz Avital, San Francisco, CA (US)

(73) Assignee: Anchor Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,400

(22) Filed: Jan. 31, 2022

(65) Prior Publication Data
US 2022/0158849 A1 May 19, 2022

Related U.S. Application Data

(63) Continuation of application No. 17/355,408, filed on Jun. 23, 2021, now Pat. No. 11,271,753, which is a
(Continued)

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/602* (2013.01); *H04L 9/0637* (2013.01);
(Continued)

(58) Field of Classification Search
CPC ................. H04L 9/3247; H04L 9/0637; H04L 9/0833; H04L 9/0877; H04L 9/14; H04L 2209/12; H04L 2209/38; G06F 21/602
See application file for complete search history.

(56) References Cited

U.S. PATENT DOCUMENTS 6,950,523 B1   9/2005   Brickell et al.
9,892,460 B1   2/2018   Winklevoss et al.
(Continued)

FOREIGN PATENT DOCUMENTS

WO   WO 2019/168792   9/2019

OTHER PUBLICATIONS

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.
(Continued)

*Primary Examiner* — Harunur Rashid
(74) *Attorney, Agent, or Firm* — Bookoff McAndrews, PLLC

(57) ABSTRACT

Methods, systems, and apparatus, including medium-encoded computer program products, for secure storage and retrieval of information, such as private keys, useable to control access to a blockchain, include, in at least one aspect, a method including: identifying for an action an associated private-keys group out of different private-keys groups, each having an associated cryptographic group key; decrypting, at a first computer, a first level of encryption of a private key associated with the action using the associated cryptographic group key; decrypting, at a second computer distinct from the first computer, a second level of encryption of the private key associated with the action using a hardware-based cryptographic key used by the second computer; using, at
(Continued)

the second computer, the private key associated with the action in a process of digitally signing data to authorize the action; and sending the digitally signed data to a third computer to effect the action.

17 Claims, 14 Drawing Sheets

Related U.S. Application Data continuation of application No. 16/276,567, filed on Feb. 14, 2019, now Pat. No. 11,082,235.

(51) Int. Cl.
*G06F 21/60* (2013.01)
*H04L 9/06* (2006.01)
*H04L 9/08* (2006.01)
*H04L 9/14* (2006.01)

(52) U.S. Cl.
CPC .......... *H04L 9/0833* (2013.01); *H04L 9/0877* (2013.01); *H04L 9/14* (2013.01); *H04L 2209/12* (2013.01); *H04L 2209/38* (2013.01)

(56) References Cited

U.S. PATENT DOCUMENTS

| | | | |
|---|---|---|---|
| 9,916,581 B2 | 3/2018 | Dorsey et al. | |
| 10,068,228 B1* | 9/2018 | Winklevoss | H04L 9/085 |
| 10,373,158 B1 | 8/2019 | James et al. | |
| 10,439,811 B2 | 10/2019 | Norton | |
| 2004/0128504 A1* | 7/2004 | Kivinen | H04L 9/3268 |
| | | | 713/158 |
| 2004/0236694 A1 | 11/2004 | Tattan | |
| 2005/0273442 A1* | 12/2005 | Bennett | H04L 9/3215 |
| | | | 705/67 |
| 2008/0031460 A1 | 2/2008 | Brookner et al. | |
| 2010/0024017 A1 | 1/2010 | Ashfield et al. | |
| 2010/0119061 A1 | 5/2010 | Kawale | |
| 2011/0154025 A1 | 6/2011 | Spalka | |
| 2012/0192260 A1* | 7/2012 | Kontsevich | G06F 21/42 |
| | | | 726/9 |
| 2014/0046842 A1 | 2/2014 | Irudayam | |
| 2014/0156534 A1 | 6/2014 | Quigley et al. | |
| 2015/0170112 A1 | 6/2015 | DeCastro | |
| 2015/0287026 A1* | 10/2015 | Yang | G06Q 20/06 |
| | | | 705/69 |
| 2015/0373122 A1* | 12/2015 | Steel | H04L 67/12 |
| | | | 709/201 |
| 2016/0189134 A1 | 6/2016 | Voege et al. | |
| 2016/0283920 A1 | 9/2016 | Fisher et al. | |
| 2016/0285872 A1 | 9/2016 | Polar | |
| 2017/0006018 A1 | 1/2017 | Campagna | |
| 2017/0154331 A1 | 6/2017 | Voorhees | |
| 2017/0230375 A1 | 8/2017 | Kurian | |
| 2017/0373849 A1 | 12/2017 | Donner et al. | |
| 2017/0374033 A1 | 12/2017 | Kovacs | |
| 2018/0130158 A1 | 5/2018 | Atkinson et al. | |
| 2018/0181737 A1 | 6/2018 | Tussy | |
| 2018/0367311 A1 | 12/2018 | Stahlberg | |
| 2018/0367316 A1* | 12/2018 | Cheng | H04L 9/3247 |
| 2019/0043022 A1 | 2/2019 | Fosmark et al. | |
| 2019/0207915 A1 | 7/2019 | Schaap | |
| 2019/0236594 A1 | 8/2019 | Ehrloch-Quinn et al. | |
| 2019/0251524 A1 | 8/2019 | Sadrizadeh et al. | |
| 2019/0266576 A1 | 8/2019 | McCauley et al. | |
| 2019/0268165 A1 | 8/2019 | Monica et al. | |
| 2019/0305956 A1 | 10/2019 | Irani, III | |
| 2019/0347666 A1 | 11/2019 | Bermudez-Cisneros et al. | |
| 2019/0356491 A1 | 11/2019 | Herder, III et al. | |
| 2019/0372779 A1 | 12/2019 | Monica et al. | |
| 2020/0167338 A1* | 5/2020 | Brock | G06F 16/2379 |
| 2020/0380523 A1 | 12/2020 | Agrawal et al. | |

OTHER PUBLICATIONS

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Wired.com [online], "Crypto anchors' might stop the next Equifax-style megabreach." Oct. 11, 2017, retrieved from: URLhttps://www.wired.com/story/crypto-anchors-breach-security/>, 11 pages.

Anonymous: "Hierarchical Deterministic: Wallets—BIP32", Feb. 2017, Retrieved from the Internet: URL:https://github.com/bitcoin/bips/blob(11 b0fa37bee4eac40c3a1be059107868$bcc3392/bip-0032.mediawiki [retrieved on Jun. 20 2018].

Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].

Bisontrails.co [online] "Bison Trails is the easiest way to run infrastructure on multiple blockchains," Retreived on Jul. 31, 2019, Retrieved from URL <https://bisontrails.co/?gclid=EAIaIQobChMItuuNvOuU5QIVB6vsCh11vQvyEAAYASAAEgIw3vD_BwE>, 6 pages.

International Search Report and Written Opinion in Application No. PCT/US2019/019414, dated May 15, 2019, 12 pages.

International Search Report and Written Opinion in Application No. PCT/US2019/019425, dated May 9, 2019, 12 pages.

PCT International Search Report and Written Opinion in International Appln. No. PCT/US2020/017411, dated Apr. 15, 2020, 19 pages.

Bonneau et al., "SoK: Research Perspectives and Challenges for Bitcoin and Cryptocurrencies," 2015 IEEE Symposium on Security and Privacy, May 17-21, 2015, San Jose, CA, USA, 104-121.

Liu et al., "Security Analysis of Electronic Payment Protocols Based on Quantum Cryptography," 2017 4th International Conference on Information Science and Control Engineering, Jul. 21-23, 2017, Changsha, China, 1709-1712.

Anonymous: "CASP Solution Overview," and "Installing Casp" Mar. 2019, retrieved from the Internet: URL: https://www.unboundtech.com/docs/CASP/Versions/1.0.1902/CASPUserGuideHTML/Content/Products/CASP/CASP_Offering_Description/Solution.htm#h2 10, 5 pages.

PCT International Search Report and Written Opinion in International Appln. No. PCT/US2020/043882, dated Nov. 2, 2020, 12 pages.

PCT International Search Report and Written Opinion in International Appln. No. PCT/US2020/045737, dated Nov. 11, 2020. 12 pages.

Sato et al., "General Security Considerations for Cryptoassets Custodians draft-vcgtf-crypto-assets-security-considerations-04," Apr. 2019, retrieved from the Internet: URL:https://tools.ietf.org/html/draft-vcgtf-crypto-assets-security-considerations-04, 47 pages.

\* cited by examiner

CRYPTOASSET CUSTODIAL SYSTEM WITH DIFFERENT CRYPTOGRAPHIC KEYS CONTROLLING ACCESS TO SEPARATE GROUPS OF PRIVATE KEYS

CROSS-REFERENCE TO RELATED APPLICATION(S)

This application is a continuation of and claims the benefit of priority to U.S. application Ser. No. 17/355,408, filed Jun. 23, 2021, which is a continuation of and claims the benefit of priority to U.S. application Ser. No. 16/276,567, filed Feb. 14, 2019, now U.S. Pat. No. 11,082,235, issued Aug. 3, 2021, both of which are incorporated by reference herein in their entireties.

BACKGROUND

Technical Field

This specification relates to computer-implemented systems and techniques for secure storage and retrieval of information, such as private keys, useable to control access to a blockchain.

Description of Related Art

A blockchain is a distributed ledger technology that enables multiple users to produce and share a verifiable record of every transaction made in a system that uses the blockchain. Blockchains can be public, private, or include both publicly and privately accessible portions. In any case, the blockchain is updated only by consensus among designated users of the system. Thus, a blockchain represents a consensus of replicated, shared, and synchronized digital data spread across multiple nodes, without a central administrator or centralized data storage. Replication and sharing, in addition to the use of cryptographic hashing techniques, give the blockchain-based distributed ledger its characteristic resiliency and protection against unauthorized alteration. However, the lack of a central administrator can also result in new risks when access keys for the blockchain are lost or stolen. This can be of particular concern when the blockchain includes large amounts of cryptographic assets, also referred to as cryptoassets, such as BITCOIN, ETHEREUM, and RIPPLE cryptocurrencies.

Such cryptocurrencies have gained in popularity and value in recent years and are expected by many to continue to do so. Every day an increasing variety of transactions are conducted based on cryptocurrencies, and it is conceivable that new types of cryptoassets may be created in the future, i.e., cryptoassets that are not necessarily currencies. With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptocurrencies or other cryptoassets.

SUMMARY

This specification describes technologies relating to computer-implemented systems and techniques for secure storage and retrieval of information, such as private keys, useable to control access to a blockchain, where the systems and techniques employ different cryptographic keys to control access to separate groups of private keys. In the context of a cryptoasset custodial system, the technical security measures taken may be breached and cryptoassets can be stolen if an access control mechanism used by the system is compromised. To address such risks, cryptographic processing techniques can be used to limit exposure of the system by employing cryptographic groupings of sensitive customer information, such as private keys of public-private asymmetric key pairs. Using such systems and techniques improves security, and can reduce damage from a breach of security, in a cryptoasset custodial system. The protected private keys can be distributed across the groups, including potentially having a single root key for a customer be protected by different cryptographic group keys. The groups can segment exposure by value amount, geographically, and/or other criteria, such as processing loads and numbers of accounts. Moreover, multiple hardware security modules can be employed, where a lowest level of encryption can be shared among hardware security modules, which facilitates moving protected information from one group to another within the cryptoasset custodial system, allowing the groupings to be readily changed as system requirements evolve over time.

One or more aspects of the subject matter described in this specification can be embodied in one or more methods that include receiving a request to take an action in a cryptoasset custodial system; identifying for the action an associated private-keys group out of multiple different private-keys groups managed by the cryptoasset custodial system, wherein each of the multiple different private-keys groups has an associated cryptographic group key; decrypting, at a first computer, a first level of encryption of a private key associated with the action using the associated cryptographic group key for the associated private-keys group out of the multiple different private-keys groups managed by the cryptoasset custodial system; decrypting, at a second computer that is distinct from the first computer, a second level of encryption of the private key associated with the action using a hardware-based cryptographic key used by the second computer; using, at the second computer, the private key associated with the action in a process of digitally signing data to authorize the action; and sending the digitally signed data to a third computer to effect the action.

The second computer can include a hardware security module including at least one secure storage device and at least one physical computing device coupled with the at least one secure storage device, and both the first computer and the second computer can be within a physical datacenter that employs an air gap to isolate the hardware security module from a network outside the cryptoasset custodial system. The air gap can include: the second computer having no direct access to any network outside the cryptoasset custodial system, and all communications from the second computer to any network outside the cryptoasset custodial system go through the first computer; and the first computer disconnects from any network outside the cryptoasset custodial system when communicating with the second computer. Further, the first computer can include a host computer for the second computer, or the first computer can be a server computer (e.g., a relay server computer) within a secure zone of the cryptoasset custodial system.

The action can include a deposit of a cryptoasset into the cryptoasset custodial system, and using the private key associated with the action in the process of digitally signing data to authorize the action can includes: deriving an asymmetric cryptographic key pair for the cryptoasset from at least the private key; generating a blockchain address in accordance with the asymmetric cryptographic key pair for the cryptoasset; and digitally signing the blockchain address with the private key. The action can include a withdrawal of a cryptoasset from the cryptoasset custodial system, and using the private key associated with the action in the process of digitally signing data to authorize the action can include: deriving a blockchain private key for the cryptoasset from at least the private key, and digitally signing the withdrawal with the blockchain private key.

The action can include a withdrawal of a cryptoasset from the cryptoasset custodial system, and using the private key associated with the action in the process of digitally signing data to authorize the action can include digitally signing the withdrawal with the private key. The action can include an update to access rules associated with a logical grouping of cryptoassets in the cryptoasset custodial system, and using the private key associated with the action in the process of digitally signing data to authorize the action can include digitally signing the update to the access rules with the private key associated with the action.

The one or more methods can include assigning private keys to respective ones of the multiple different private-keys groups based on an amount of cryptoassets associated with the respective ones of the multiple different private-keys groups managed by the cryptoasset custodial system. The hardware-based cryptographic key can be shared among hardware security modules, e.g., hardware security modules located in different physical datacenters. The one or more methods can include reassigning the private keys to the respective ones of the multiple different private-keys groups based on the amount of cryptoassets associated with the respective ones of the multiple different private-keys groups managed by the cryptoasset custodial system; and for each private key reassigned from one group to another group, first-level decrypting the reassigned private key at a computer with access to a cryptographic group key for the one group, and first-level encrypting the reassigned private key, without second-level decrypting the reassigned private key, at a computer with access to a cryptographic group key for the other group. The private keys assigned to respective ones of the multiple different private-keys groups can be root keys for customers of the cryptoasset custodial system.

The assigning can include: distributing cryptoassets accessible using an individual private key of an individual customer among the multiple different private-keys groups; and excluding any private-keys group of the multiple different private-keys groups from consideration for a deposit when an amount of cryptoassets associated with the private-keys group exceeds a threshold. The one or more methods can include assigning private keys to respective ones of the multiple different private-keys groups based on customer or customer type, geographic distribution sets, risk profile, usage pattern, or a combination thereof. Further, the one or more methods can include reassigning the private keys to the respective ones of the multiple different private-keys groups based on customer or customer type, geographic distribution sets, risk profile, usage pattern, or a combination thereof and for each private key reassigned from one group to another group, first-level decrypting the reassigned private key at a computer with access to a cryptographic group key for the one group, and first-level encrypting the reassigned private key, without second-level decrypting the reassigned private key, at a computer with access to a cryptographic group key for the other group.

The cryptoasset custodial system can include two or more physical datacenters that each employ air gap isolation, each of the two or more physical datacenters including at least one first computer and two or more hardware security modules, and the multiple different private-keys groups managed by the cryptoasset custodial system can be allocated among the two or more physical datacenters. At least a first physical datacenter of the two or more physical datacenters can be physically placed in a different geographic location than that of at least a second physical datacenter of the two or more physical datacenters. Further, a key storage facility (from which the private key, with the at least two levels of encryption, is retrieved) can have at least one geographic location that is different from that of both the first physical datacenter and the second physical datacenter.

The one or more methods can be implemented using one or more computer-readable mediums encoding one or more computer programs operable to cause first and second computers (e.g., a server computer and a hardware security module, including at least one secure storage device and at least one physical computing device coupled with the at least one secure storage device) to perform operations of the one or more methods. The one or more methods can be implemented in a cryptoasset custodial system including first and second computers configured to perform operations of the one or more methods.

For example, one or more aspects of the subject matter described in this specification can be embodied in one or more cryptoasset custodial systems that include: two or more physical datacenters, wherein each of the two or more physical datacenters employs an air gap to isolate internal components from an outside network, and each of the two or more physical datacenters includes at least one first computer configured to provide cryptographic processing using a cryptographic group key associated with one private-keys group from different private-keys groups, and two or more hardware security modules connected with each of the at least one first computer and configured to provide cryptographic processing using a hardware-based cryptographic key, wherein each of the two or more hardware security modules includes at least one secure storage device and at least one physical computing device coupled with the at least one secure storage device; and one or more server computers communicatively coupled with the two or more physical datacenters and configured to receive requests to take actions in the cryptoasset custodial system; wherein for each request, the one or more server computers are configured to identify for the action an associated private-keys group and send at least a doubly encrypted private key associated with the action to a corresponding one of the two or more physical datacenters, the at least one first computer is configured to, within the physical datacenter and protected by the air gap, decrypt a first level of encryption of the doubly encrypted private key using the associated cryptographic group key and send the partially decrypted private key to a hardware security module within the physical datacenter, and the hardware security module within the physical datacenter is configured to, within the physical datacenter and protected by the air gap, decrypt a second level of encryption of the doubly encrypted private key using the hardware-based cryptographic key and use the fully decrypted private key in a process of digitally signing data to authorize the action.

The one or more server computers can include a server computer configured to assign private keys to respective ones of the multiple different private-keys groups based on an amount of cryptoassets associated with the respective ones of the multiple different private-keys groups managed by the cryptoasset custodial system. The hardware-based cryptographic key can be shared among hardware security modules, e.g., hardware security modules located in different physical datacenters. The one or more server computers can include a server computer configured to reassign the private keys to the respective ones of the multiple different private-keys groups based on the amount of cryptoassets associated with the respective ones of the multiple different private-keys groups managed by the cryptoasset custodial system, and for each private key reassigned from one group to another group, a computer with access to a cryptographic group key for the one group is configured to first-level decrypt the reassigned private key, and a computer with access to a cryptographic group key for the other group is configured to first-level encrypt the reassigned private key without second-level decrypting the reassigned private key. Further, the private keys assigned to respective ones of the multiple different private-keys groups can be root keys for customers of the cryptoasset custodial system.

Moreover, at least a first physical datacenter of the two or more physical datacenters can be physically placed in a different geographic location than that of at least a second physical datacenter of the two or more physical datacenters. And the one or more server computers can include a key storage facility from which the doubly encrypted private key is retrieved, and the key storage facility can have at least one geographic location that is different from that of both the first physical datacenter and the second physical datacenter.

BRIEF DESCRIPTION OF THE DRAWINGS

Various embodiments of the present disclosure are shown by way of example and not limitation in the figures of the accompanying drawings, in which like references indicate similar elements.

DETAILED DESCRIPTION

Figure 1:
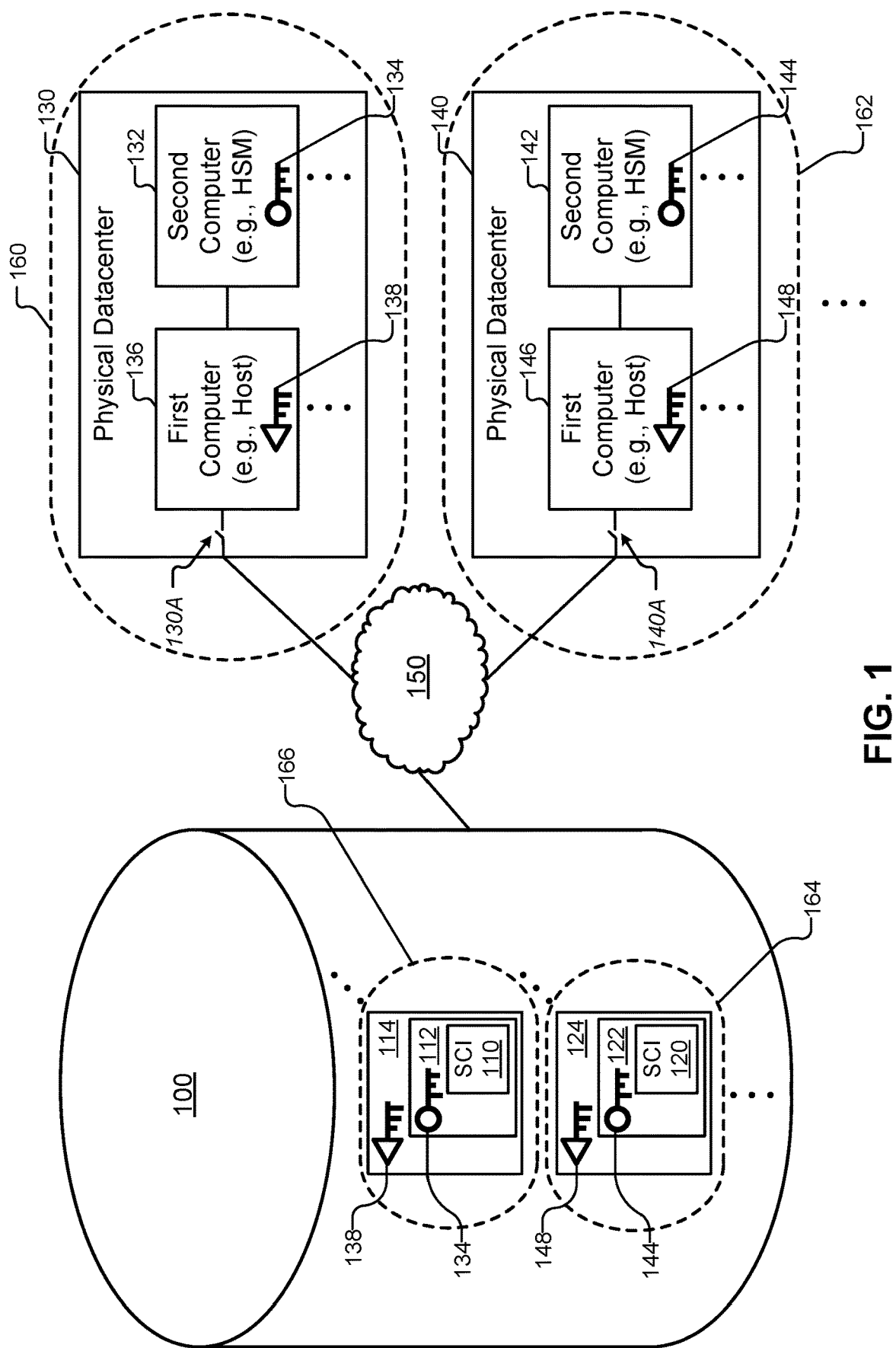
FIG. 1 is a schematic diagram showing an example of access control for a cryptoasset custodial system (CCS).

In this description, references to "an embodiment", "one embodiment" or the like, mean that the particular feature, function, structure or characteristic being described is included in at least one embodiment of the systems and techniques being described. Occurrences of such phrases in this specification do not necessarily all refer to the same embodiment. On the other hand, the embodiments referred to also are not necessarily mutually exclusive.

Overview

Introduced here is a computer-implemented cryptoasset custodial system (CCS), i.e., a computer-implemented system for maintaining custody of, and controlling access to, cryptocurrencies and/or other cryptoassets. The CCS may be owned and/or operated by a business enterprise, referred to herein as the Cryptoasset Custodian, on behalf of one or more customers who may each have multiple users (employees or retail customers) of the CCS. The CCS employs cryptographic groupings of sensitive customer information (SCI) such as private keys of public-private asymmetric key pairs. Each of these different groups is protected using at least two cryptographic keys that, in some implementations, are only usable within a physical datacenter that is isolated (e.g., air gapped) from any networks outside the CCS during decryption of the SCI. Moreover, SCI can be readily moved from one group to another within the CCS, and each physical datacenter can include multiple hardware security modules (HSMs). As used herein, the term "hardware security module" or "HSM" refers to a special-purpose physical computing device that safeguards and manages digital keys for authentication and provides cryptoprocessing functionality. The HSM can be embodied as a plug-in card or an external device that attaches directly to a computer.

In some embodiments, the CCS also includes logical groupings of cryptoassets (referred to as "vaults") to limit access to the private keys usable to control access to the cryptoassets in at least one blockchain, where the logical groupings are controlled by one or more hardware security modules. In some embodiments, the CCS includes a combination of biometric-based multi-user validation, transaction risk analysis, and use of a hardware security module (HSM) to provide authentication/validation functionality and secure storage of private keys of cryptoassets. Furthermore, two or more different biometric authentication techniques may be applied to any given transaction request. In addition, in some embodiments, when a user requests a transaction involving a cryptoasset, such as a withdrawal or transfer of cryptocurrency funds, the CCS causes an endorsement request message to be sent to each of multiple user devices, each of which is associated with a different user who has been defined as a potential member of a quorum for transactions involving that cryptoasset (in other embodiments, multiple users may share the same user device). The endorsement request message is configured to cause each receiving user device to prompt its user to provide an endorsement of the requested transaction. An endorsement in this context is an approval or rejection of an operation by a user. When a user receiving such a prompt endorses the transaction on his or her user device (e.g., a smartphone, tablet or notebook computer), the user device signs an endorsement message with a private key of that user and transmits the signed endorsement message to the CCS.

The private key is stored within a secure enclave within the user device. A secure enclave in each user device is used to store the corresponding user's private key and to generate digital signatures of that user.

For any action with respect to a vault, the HSM determines whether the policy map for the vault is authentic, and if so, the HSM only allows the action when it conforms to the rules set forth in the authenticated policy map. In some embodiments, the HSM determines whether a policy-based quorum of multiple users has endorsed (approved) a requested action, such as a withdrawal or transfer of cryptocurrency funds. It does this by validating the signature using a public key of a public-private key pair for each of the plurality of users, in endorsement messages received from the users. After determining that the policy-based quorum of the multiple users has validly endorsed the requested action, the HSM then allows itself to access the private key of that particular cryptographic asset (e.g., for a specific deposit of cryptocurrency funds), which the HSM previously generated, and uses that private key to sign the transaction as authorization that the transaction may proceed. The private key for that cryptoasset is stored in (or otherwise controlled by) only the HSM, which does not permit the key to be obtained by any entity outside the HSM. Approval of the transaction may include, for example, transmitting the transaction onto a known blockchain network. In some embodiments, approval of the transaction by the HSM occurs only if and after the requested transaction has passed a risk review, which may be partially or fully automated. Other details will become apparent from the description that follows. Note also that it is contemplated the system and techniques introduced here can be used for secure custody of other types of digital assets besides cryptoassets.

Cryptoasset Custodial System (CCS)

FIG. 1 is a schematic diagram showing an example of access control for a cryptoasset custodial system (CCS). The CCS includes a storage facility 100 that retains sensitive customer information (SCI) 110, 120 used by the CCS. At a minimum, the SCI 110, 120 includes private keys 110, 120 of customers of the CCS, and thus the storage facility 100 can be referred to as a key storage facility 100, even though the key storage facility 100 can also retain additional information, e.g., policy maps, which can be included in SCI 110, 120 or separate from SCI 110, 120. The key storage facility 100 can include one or more databases, which can be cloud-based and accessible over a computer network 150. Further, the computer network 150 can be a public network, a private network, a virtual private network, etc.

As noted, the SCI 110, 120 includes private keys 110, 120, and the private keys 110, 120 can include customer account keys, e.g., an organization's private keys or cryptographic keys 332, as described further below, or cryptoasset private keys usable to access one or more blockchains. In any case, the private keys 110, 120 are at least doubly encrypted. Thus, SCI 110 has a layer of encryption 112 that requires a hardware-based cryptographic key 134 to obtain SCI 110 in fully decrypted form, and the encrypted SCI 112 has another layer of encryption 114 that requires a cryptographic group key 138 to decrypt the encrypted SCI 114. Likewise, SCI 120 has a layer of encryption 122 that requires a hardware-based cryptographic key 144 to obtain SCI 120 in fully decrypted form, and the encrypted SCI 122 has another layer of encryption 124 that requires a cryptographic group key 148 to decrypt the encrypted SCI 124. While additional layers of encryption can be used, e.g., between the two layers shown or outside the two layers shown, this double layer of encryption means that access to the key storage facility 100 does not provide usable access to SCI 110, 120 without also having access to the keys 134, 138, 144, 148.

Access to the keys 134, 138, 144, 148 is limited to physical datacenters 130, 140. A first physical datacenter 130 includes a first computer 136 and a second computer 132, where the first computer 136 can decrypt data using cryptographic group key 138, and the second computer 132 can decrypt data using hardware-based cryptographic key 134. Likewise, a second datacenter 140 includes a first computer 146 and a second computer 142, where the first computer 146 can decrypt data using cryptographic group key 148, and the second computer 142 can decrypt data using hardware-based cryptographic key 144. Each respective physical datacenter 130, 140 can employ a respective air gap 130A, 140A to isolate the computers 132, 142, 136, 146 from a network outside the CCS.

In some implementations, each respective second computer 132, 142 has no direct access to any network outside the CCS, and all communications from a second computer 132, 142 to any network outside the CCS go through a corresponding first computer 136, 146. Moreover, the air gaps 130A, 140A are effected by each respective first computer 136, 146 disconnecting from any network outside the CCS when communicating with a respective second computer 132, 142. Further details regarding such an air gap mechanism are described below. Other air gap mechanisms are possible, including using multiple relay computers. But in some implementations, no air gaps are used.

As shown, the CCS includes two or more physical datacenters 130, 140, and each physical datacenter 130, 140 can include one or more second computers 132, 142 and one or more first computers 136, 146. In some embodiments, each of the second computers 132, 142 is an HSM, and each of the first computers 136, 146 is a host computer for one or more attached HSMs. In some embodiments, each of the second computers 132, 142 is an HSM, and each of the first computers 136, 146 is a relay server computer. Further details regarding HSMs and relay servers are described below. In addition, it will be appreciated that various combinations of these elements are possible.

For example, in some implementations, a physical datacenter includes more than one relay server computer with its own associated air gap to create its own secure zone, each relay server computer can be connected to more than one HSM host computer, and each HSM host computer can be connected to multiple HSMs. Moreover, the two or more first computers 136, 146 within a single physical datacenter can each have their own specific cryptographic group key 138, 148, or two or more first computers 136, 146 within a single physical datacenter can work together to provide decryption services for an encryption layer 114 using a shared cryptographic group key 138. However, in some embodiments, each respective cryptographic group key 138, 148 is only retained within a single physical datacenter in order to improve overall security for the CCS, as someone with access to one physical datacenter can only compromise the cryotgraphic group(s) that physical datacenter has access to.

In addition, in some embodiments, each of multiple second computers 132, 142 has a unique hardware-based cryptographic key 134, 144, but in other embodiments, one or more of the hardware-based cryptographic keys 134, 144 are shared among the second computers within a single physical datacenter and/or are shared among the second computers located in different single physical datacenters. This sharing of the hardware-based cryptographic keys 134, 144 provides the CCS with improved hardware processing availability (e.g., multiple different HSMs can be used for any given request) and facilitates rebalancing of the amount of cryptoassets assigned to different private-keys groups. For example, in some embodiments, all HSMs 132, 142 use a common hardware-based cryptographic key, i.e., key 134 is the same as key 144, while keys 138, 148 remain different, which allows seamless movement of protected SCI 110, 120 (e.g., an organization's private keys) among different cryptographic groups that are processed in different physical datacenters 130, 140 when the amount of cryptoassets in the different cryptographic groups needs to be rebalanced. Moreover, as other criterial (e.g., geographic criteria) can be used for assignment to (and rebalancing of) the different private-keys groups, the use of one or more commonly shared hardware-based cryptographic keys allows the groups to be readily changed as system requirements evolve over time. Note that rewrapping the SCI 110, 120 (encryption with the different group keys 138, 148) happens outside the second computers 132, 142, and so the SCI 110, 120 is never fully decrypted outside of one of the second computers 132, 142 during a rebalancing operation, e.g., when the first computer 136 decrypts protected SCI 114 using key 138 and then sends protected SCI 112 to the second computer 146 to encrypt the protected SCI 112 using key 148.

Moreover, to further improve security in the CCS, in some implementations, two or more of the physical datacenters 130, 140 are physically placed in different geographic locations 160, 162. Likewise, the key storage facility 100 can also be placed in a geographic location that is different from the geographic locations 160, 162 of two or more of the physical datacenters 130, 140. Further, in some embodiments, the key storage facility 100 is a distributed database where different SCI 110, 120 is retained in different geographic locations 164, 166.

Figure 2A:
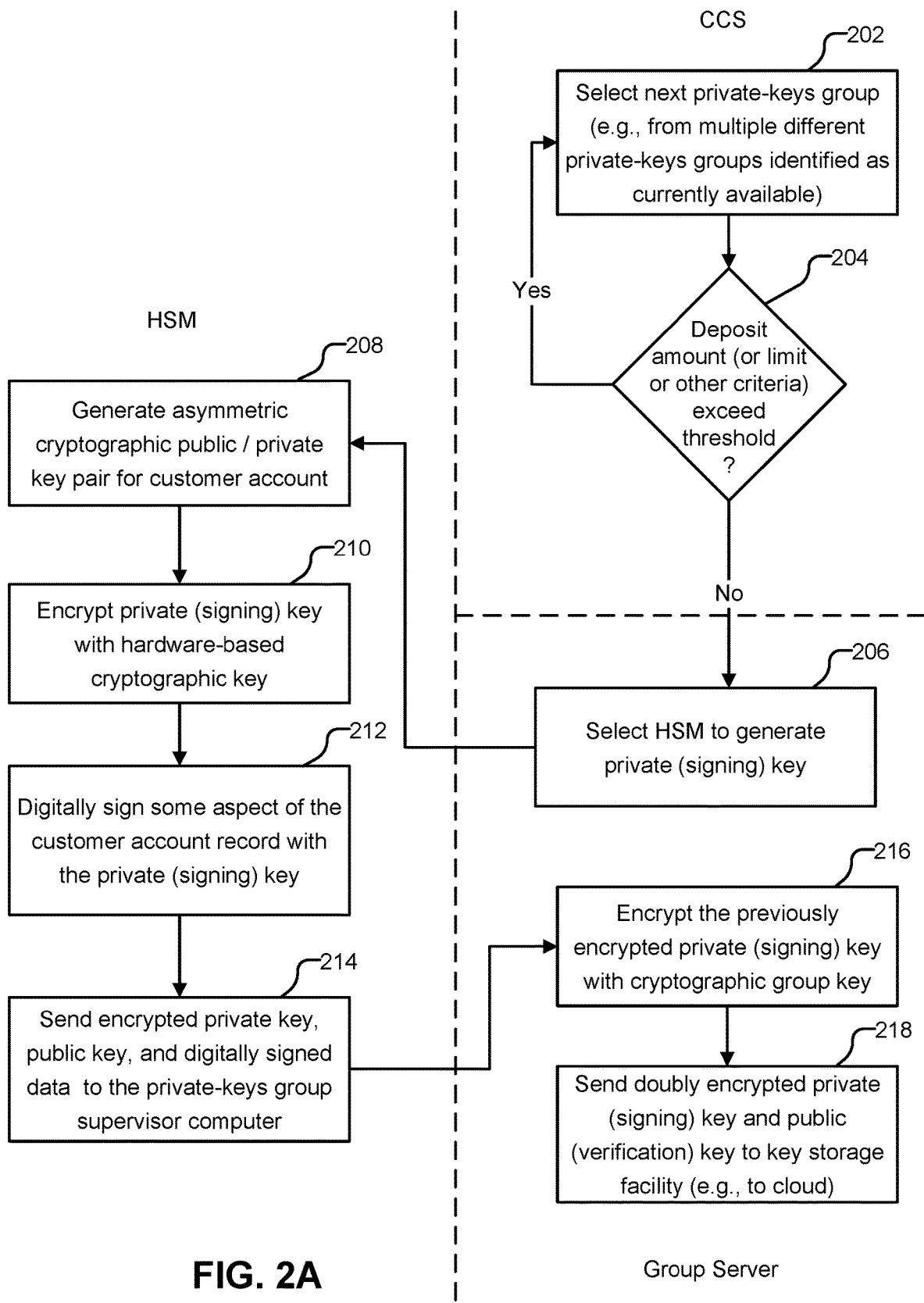
FIG. 2A is a flow diagram showing an example of distributing customer accounts in a CCS to limit access to sensitive customer information.

FIG. 2A is a flow diagram showing an example of distributing customer accounts in a CCS to limit access to sensitive customer information. In response to a request to generate a customer account (e.g., an Organization data structure, as described below) a request is sent to a CCS computer, and the CCS computer selects 202 a next private-keys group (e.g., from multiple different private-keys groups identified as currently available). The criteria used to decide which private-keys groups are available can include current processing loads being experienced by the private-keys group servicing computers, the number of accounts assigned to the group, the amount of cryptoassets assigned to the group, or a combination thereof. Further, a check 204 can be made to see if a deposit amount (in the event that that account is being created for a new deposit) or a deposit limit amount or other criteria associated with the account being created will exceed a threshold for the private-keys group. Note that selection 202 and check 204 can be performed by a computer in the CCS that is within a datacenter (e.g., behind an air gap) or outside of a datacenter.

In addition, note that the selection 202 and check 204 can include checking other criteria, such as geographic criteria, for assignment to a private-keys group. As noted above, other criteria can be used for assignment to (and rebalancing of) the different private-keys groups, e.g., in connection with the use of one or more commonly shared hardware-based cryptographic keys, which facilitates the groups being changed over time. For example, in some embodiments, the assignment/rebalancing 202, 204 of the privates keys among the private-keys groups is done based on customer or customer type, geographic distribution sets, risk profile, usage pattern, or a combination of the forgoing. In general, any suitable factor that allows increased reliability and decreased risk for the CCS can be used in the assignment/rebalancing 202, 204 operations.

In any case, once a private-group is selected, a request is sent to the group server for the selected private-keys group, and this group server can select 206 an HSM to generate a private (signing) key for the requested customer account. In response, the HSM generates 208 an asymmetric cryptographic public-private key pair for the customer account. For example, the HSM can produce keys for a provisional Organization data structure by generating a random digital signature public/private key pair: VerificationKey$_{org}$ and SigningKey$_{org}$. Then, the HSM encrypts 210 the private key with a hardware-based cryptographic key, e.g., key 134, key 322, etc. For example, the HSM can encrypt the signing key with its own in-hardware HSM master key to produce ENC(SigningKey$_{org}$)$_{HSM}$. The HSM then digitally signs 212 some aspect of the customer account record with the private (signing) key. For example, the HSM can sign the complete Organization data structure with SigningKey$_{org}$ to produce OrgSignature.

After the HSM performs the generation 208, encryption 210 and digital signing 212, the HSM sends 214 the encrypted private key, the public key, and the digitally signed data to the private-keys group server for the selected group. Other information can also be sent 214. For example, the HSM can forward Organization, OrgSignature, VerificationKey$_{org}$ and ENC(SigningKey$_{org}$)$_{HSM}$ to the group supervisor located in its same secure zone. As another example, the HSM can forward OrgSignature, VerificationKey$_{org}$ and ENC(SigningKey$_{org}$)$_{HSM}$ to the group supervisor located in its same secure zone when the group supervisor already has the Organization or doesn't need this information. In addition, after sending 214 the information, the HSM can then discard all this information from its memory, e.g., including the plaintext SigningKey$_{org}$.

The group server computer then encrypts 216 the previously encrypted private key with its cryptographic group key, e.g., key 138. Thus, the group server computer adds a second layer of encryption that is unique to its group, and the group server computer sends 218 the doubly encrypted private key, the public key, and the digitally signed data to a key storage facility, e.g., storage facility 100 in the cloud. Other information can also be sent 218. For example, the group server computer can forward Organization, OrgSignature, Group Identifier, VerificationKey$_{org}$ and ENC(ENC (SigningKey$_{org}$)$_{HSM}$) group to the cloud. As another example, the group server computer can forward OrgSignature, VerificationKey$_{org}$ and ENC(ENC(SigningKey$_{org}$)$_{HSM}$)$_{group}$ to the cloud when the cloud already has the Organization and the Group Identifier. In any case, the storage facility persists customer account information, the doubly encrypted private (signing) key, the public (verification) key, and the digitally signed data in association with the selected private-keys group, e.g., the cloud persists Organization, OrgSignature, Group Identifier, VerificationKey$_{org}$ and ENC(ENC(SigningKey$_{org}$)$_{HSM}$)$_{group}$ to a database in associated with one another, for subsequent use in processing actions in the CCS.

Figure 2B:
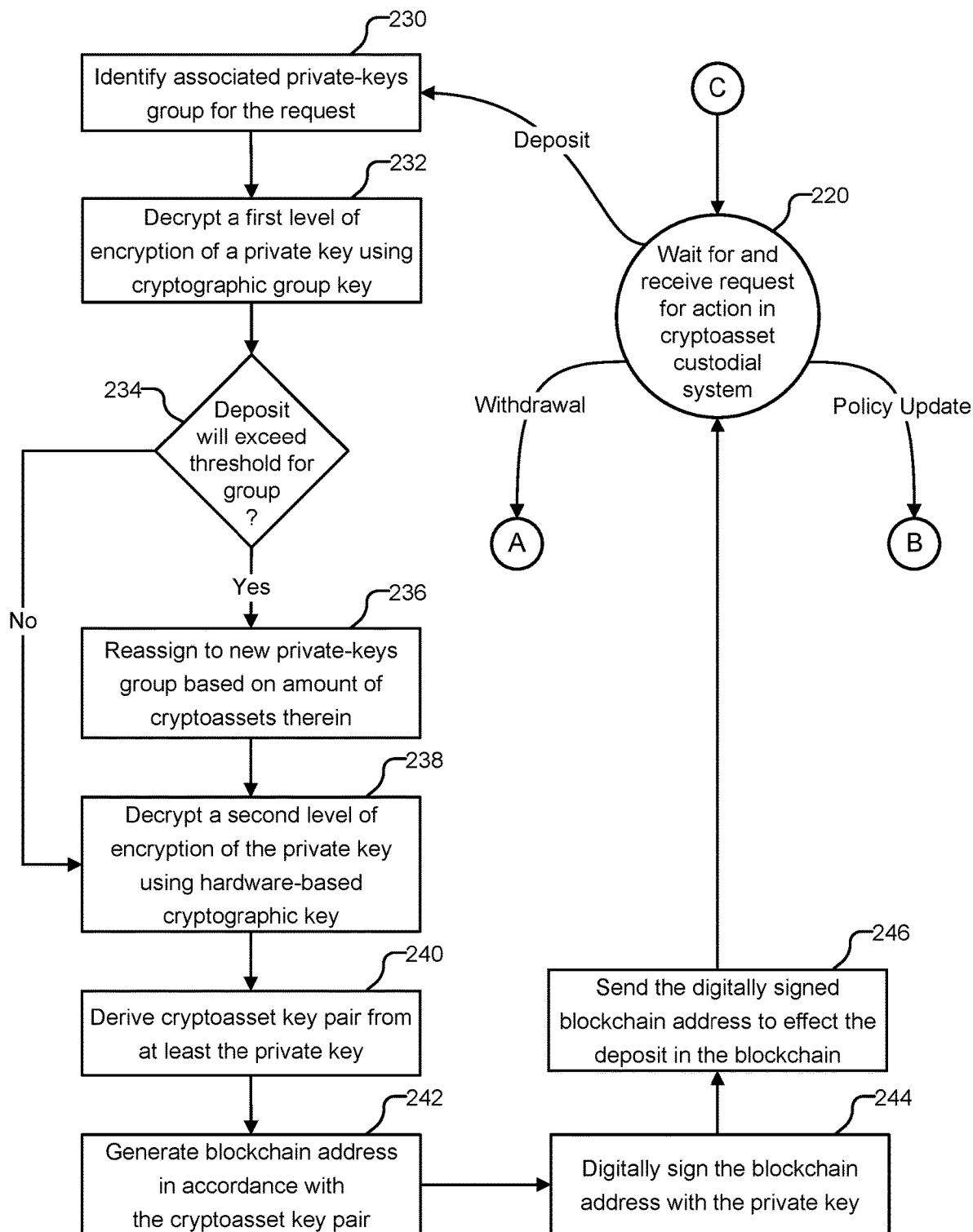
FIGS. 2B & 2C are a state and flow diagram showing an example of actions taken in a CCS while limiting access to sensitive customer information.
Figure 2C:
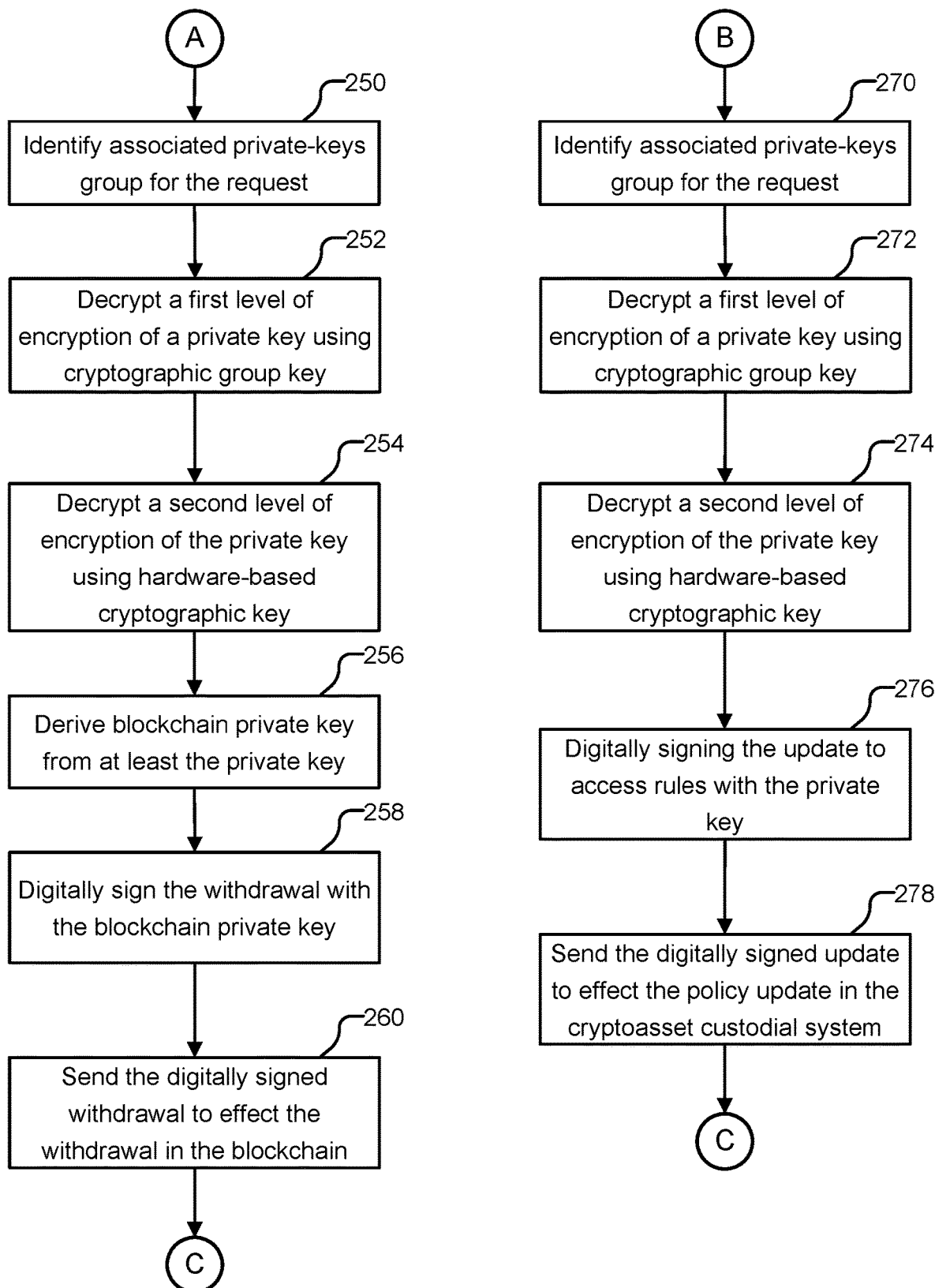

FIGS. 2B & 2C are a state and flow diagram showing an example of actions taken in a CCS while limiting access to sensitive customer information. In this example, the private keys that are grouped and doubly encrypted are the private keys for different customer accounts, e.g., SigningKey$_{org}$, which serve as root keys for each customer account, e.g., one root key per customer, or one root key per account, where a single customer can have more than one account. But as noted above, rather than (or in addition to) grouping by customer account, the CCS can group and doubly encrypt the cryptoasset private keys.

At 220, the process waits for a next request, and when a next request for an action is received 220 in the CCS, the subsequent processing is determined in accordance with the type of action. For example, the CCS receives a request to generate a blockchain address for a new deposit in the CCS. When the action is a deposit of a cryptoasset into the cryptoasset custodial system, an associated private-keys group is identified 230 for the request, where the associated private-keys group is one group out of multiple different private-keys groups managed by the cryptoasset custodial system, and each of the multiple different private-keys groups has an associated cryptographic group key. For example, the received request can include an organization or account identifier that can be used to retrieve from the database the Organization, OrgSignature, Group Identifier, VerificationKey$_{org}$ and ENC(ENC(SigningKey$_{org}$)$_{HSM}$)$_{group}$.

A first level of encryption of a private key is decrypted 232, at a first computer, e.g., server or host computer 136, using the cryptographic group key, e.g., key 138. For example, the CCS forwards the Organization, OrgSignature, VerificationKey$_{org}$ and ENC(ENC(SigningKey$_{org}$)$_{HSM}$)$_{group}$ to the physical datacenter responsible for the group, and the group supervisor uses its group key (within its secure zone) to unwrap the first layer of encryption from the signing key.

A check 234 is made to determine whether the deposit will exceed a threshold for the group. If so, the private key is reassigned 236 to a new private-keys group based on an amount of cryptoassets associated with the private-keys group. If the deposit will not exceed the threshold, no reassignment is performed. Moreover, the check 234 and reassignment 236 can include one or more of the assignment processes described above and be performed by the group supervisor or by another computer in the CCS. Thus, the check 234 and reassignment 236 need not be performed within the secure zone, and the reassignment 236 can include reassignment based on one or more additional (or alternative) criteria, such as geographic location, e.g., assigning customer to certain datacenter locations, processing loads, the number of assigned accounts, etc. For example, in some embodiments, the assignment/rebalancing 234, 236 of the privates keys among the private-keys groups is done based on customer or customer type, geographic distribution sets, risk profile, usage pattern, or a combination of the forgoing. In general, any suitable factor that allows increased reliability and decreased risk for the CCS can be used in the assignment/rebalancing 234, 236 operations.

A second level of encryption of the private key is decrypted 238, at a second computer, e.g., HSM 132, using the hardware-based cryptographic key, e.g., key 134, to reveal the fully decrypted private key. Note that the fully decrypted private key is only available inside the HSM hardware itself, as discussed in further detail below. For example, the group supervisor forwards Organization, OrgSignature, and ENC(SigningKey$_{org}$)$_{HSM}$ to the HSM in its same secure zone, and the HSM uses its master key to remove the second layer of encryption to produce the cleartext SigningKey$_{org}$. Note that the VerificationKey$_{org}$ need not be sent to the HSM when the HSM can derive VerificationKey$_{org}$ from the cleartext SigningKey$_{org}$, but in some embodiments, the VerificationKey$_{org}$ is also forwarded to the HSM. In addition, the deposit process can include verification of one or more policy maps, e.g., verifying the OrgSignature of the Organization using the VerificationKey$_{org}$, as described further below.

In any case, with the private key is fully decrypted, the private key can then be used, at the second computer, in a process of digitally signing data to authorize the deposit. An asymmetric cryptographic key pair for the cryptoasset is derived 240 from at least the fully decrypted private key, e.g., using a key derivation function (KDF) as described below. A blockchain address is generated 242 in accordance with the asymmetric cryptographic key pair for the cryptoasset. The blockchain address is digitally signed 244 with the fully decrypted private key. The digitally signed blockchain address is sent 246 to another computer to effect the deposit in the blockchain. After sending 246 the information, the HSM and group supervisor can clear all parameters received in the request from their memories and await the next request. In addition, as noted, this deposit process can be implemented using the systems and techniques described in further detail below. For example, additional details for a deposit process are provided below in connection with FIGS. 4A and 4B.

After a deposit, the process waits at 220 for a next request, and when a next request for an action is received 220 in the CCS, the subsequent processing is determined in accordance with the type of action. For example, the CCS receives a request to sign a transaction withdrawing cryptoassets from the CCS. When the action is a withdrawal of a cryptoasset from the cryptoasset custodial system, an associated private-keys group is identified 250 for the request, where the associated private-keys group is one group out of multiple different private-keys groups managed by the cryptoasset custodial system, and each of the multiple different private-keys groups has an associated cryptographic group key. For example, the received request can include an AssetID (and potentially a VaultID) that can be used to retrieve from the database the Organization, OrgSignature, Group Identifier, VerificationKey$_{org}$ and ENC(ENC(SigningKey$_{org}$)$_{HSM}$)$_{group}$.

A first level of encryption of a private key is decrypted 252, at a first computer, e.g., server or host computer 136, using the cryptographic group key, e.g., key 138. For example, the CCS forwards the Organization, OrgSignature, AssetID, VerificationKey$_{org}$ and ENC(ENC(SigningKey$_{org}$)$_{HSM}$)$_{group}$ to the physical datacenter responsible for the group, and the group supervisor uses its group key (within its secure zone) to unwrap the first layer of encryption from the signing key. In some embodiments, the CCS also forwards Endorsements and VaultID to the physical datacenter responsible for the group.

A second level of encryption of the private key is decrypted 254, at a second computer, e.g., HSM 132, using the hardware-based cryptographic key, e.g., key 134, to reveal the fully decrypted private key. For example, the group supervisor forwards Organization, OrgSignature, AssetID, and ENC(SigningKey$_{org}$)$_{HSM}$ to the HSM in its same secure zone, and the HSM uses its master key to remove the second layer of encryption to produce the cleartext SigningKey$_{org}$. Note that the VerificationKey$_{org}$ need not be sent to the HSM when the HSM can derive VerificationKey$_{org}$ from the cleartext SigningKey$_{org}$, but in some embodiments, the VerificationKey$_{org}$ is also forwarded to the HSM. In addition, the withdrawal process can include verification of one or more policy maps, e.g., verifying the OrgSignature of the Organization using the VerificationKey$_{org}$, as described further below. In some embodiments, the group supervisor also forwards Endorsements and VaultID to the HSM.

In any case, with the private key is fully decrypted, the private key can then be used, at the second computer, in a process of digitally signing data to authorize the withdrawal. A blockchain private key for the cryptoasset is derived 256 from at least the fully decrypted private key, e.g., using a KDF as described below, and the withdrawal is digitally signed 258 with the blockchain private key. The digitally signed withdrawal is sent 260 to another computer to effect the withdrawal in the blockchain, e.g., the signed transaction is returned to the cloud, which in turn broadcasts it for inclusion in that asset's blockchain. After sending 260 the information, the HSM and group supervisor can clear all parameters received in the request from their memories and await the next request. In addition, as noted, this withdrawal process can be implemented using the systems and techniques described in further detail below. For example, additional details for a withdrawal process are provided below in connection with FIGS. 5A and 5B.

After a withdrawal, the process waits at 220 for a next request, and when a next request for an action is received 220 in the CCS, the subsequent processing is determined in accordance with the type of action. For example, the CCS receives a request to update access rules associated with a logical grouping of cryptoassets in the cryptoasset custodial system. When the action is a rules update in the cryptoasset custodial system, an associated private-keys group is identified 270 for the request, where the associated private-keys group is one group out of multiple different private-keys groups managed by the cryptoasset custodial system, and each of the multiple different private-keys groups has an associated cryptographic group key. For example, the received request can include a user account identifier that can be used to retrieve from the database the Organization, OrgSignature, Group Identifier, VerificationKey$_{org}$ and ENC (ENC(SigningKey$_{org}$)$_{HSM}$)$_{group}$.

A first level of encryption of a private key is decrypted 272, at a first computer, e.g., server or host computer 136, using the cryptographic group key, e.g., key 138. For example, the CCS forwards the Organization, OrgSignature, VerificationKey$_{org}$ and ENC(ENC(SigningKey$_{org}$)$_{HSM}$)$_{group}$ to the physical datacenter responsible for the group, and the group supervisor uses its group key (within its secure zone) to unwrap the first layer of encryption from the signing key. In some embodiments, the CCS also forwards Endorsements and VaultID to the physical datacenter responsible for the group.

A second level of encryption of the private key is decrypted 274, at a second computer, e.g., HSM 132, using the hardware-based cryptographic key, e.g., key 134, to reveal the fully decrypted private key. For example, the group supervisor forwards Organization, OrgSignature, and ENC(SigningKey$_{org}$)$_{HSM}$ to the HSM in its same secure zone, and the HSM uses its master key to remove the second layer of encryption to produce the cleartext SigningKey$_{org}$. Note that the VerificationKey$_{org}$ need not be sent to the HSM when the HSM can derive VerificationKey$_{org}$ from the cleartext SigningKey$_{org}$, but in some embodiments, the VerificationKey$_{org}$ is also forwarded to the HSM. In addition, the rules update process can include verification of one or more policy maps, e.g., verifying the OrgSignature of the Organization using the VerificationKey$_{org}$, as described further below. In some embodiments, the group supervisor also forwards Endorsements and VaultID to the HSM.

In any case, with the private key is fully decrypted, the private key can then be used, at the second computer, in a process of digitally signing data to authorize the rules update. The update to the access rules are digitally signed 276 with the fully decrypted private key, and the digitally signed rules update is sent 278 to another computer to effect the policy update in the CCS. For example, the new OrgSignature can be sent to the database for storing in association with the updated Organization. After sending 278 the information, the HSM and group supervisor can clear all parameters received in the request from their memories and await the next request. In addition, as noted, this withdrawal process can be implemented using the systems and techniques described in further detail below. For example, additional details for a rules update process are provided below in connection with FIGS. 3A and 6.

Vaults System for HSM

Figure 3A:
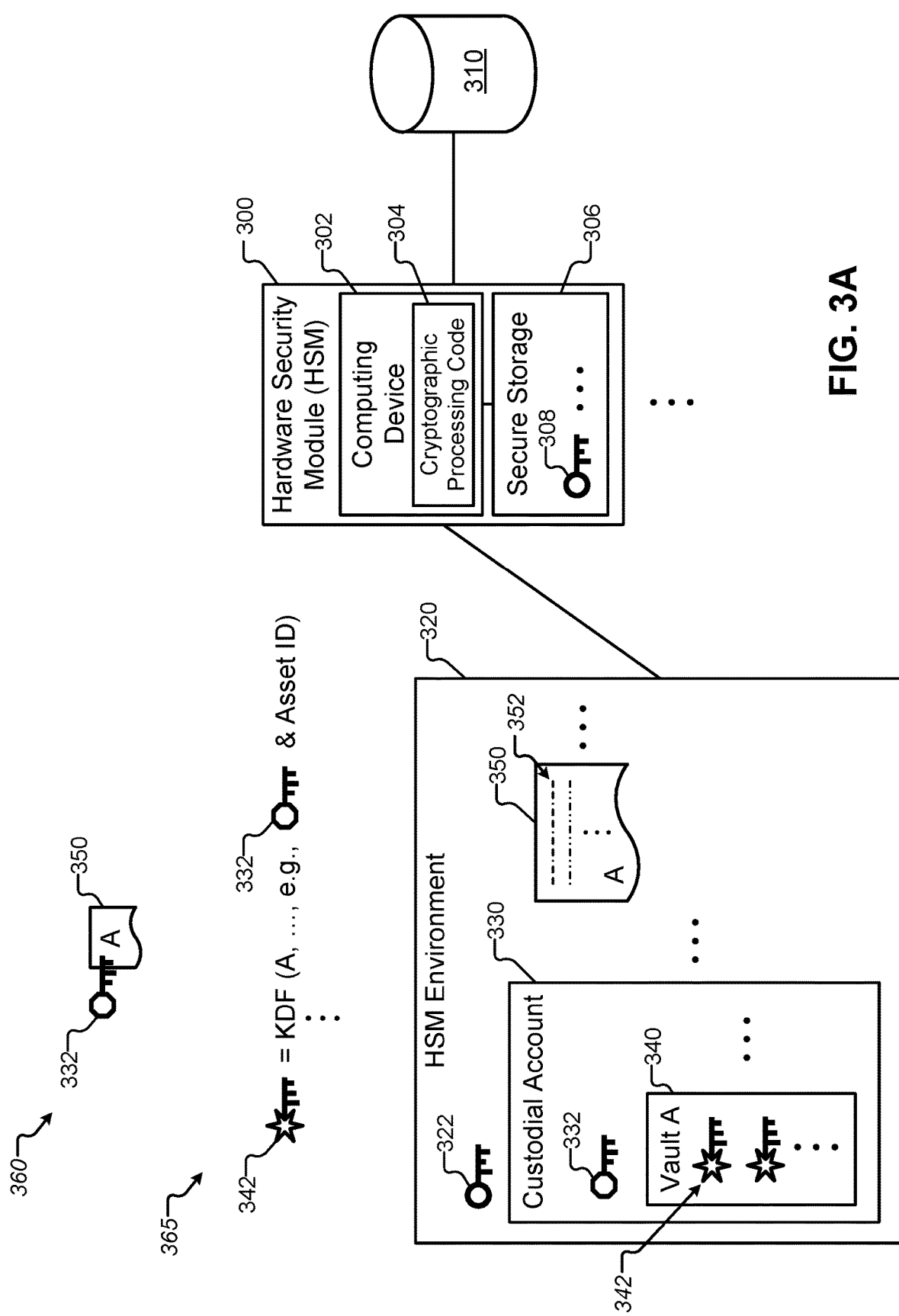
FIG. 3A is a schematic diagram showing an example of a structure of access rules enforced by a hardware security module (HSM).

In addition to private-keys grouping and double encryption, a vaults system can be used in the CCS. FIG. 3A is a schematic diagram showing an example of a structure of access rules enforced by an HSM 300. The HSM 300 includes at least one physical computing device 302, which executes cryptographic processing code 304 that manages private keys of asymmetric cryptographic key pairs usable to control access to cryptoassets in at least one blockchain. The HSM 300 also includes at least one secure storage device 306 coupled with the physical computing device 304. In some embodiments, the secure storage device 306 is coupled with the physical computing device 302 by being integrated therewith. For example, the secure storage device 306 can be a non-volatile memory device included in an integrated circuit chip including the physical computing device 302, and the cryptographic processing code 304 can be stored in (and potentially run directly from) the secure non-volatile memory device 306.

In some embodiments, the physical computing device(s) 302 and the secure storage device(s) 306 of the HSM 300 are implemented as a Secure Execution Environment (SEE), where the code 304 cannot be changed except through physical access to the HSM 300, and any change to the code 304 requires a set of smartcards held securely by multiple employees of the Cryptoasset Custodian. In some embodiments, a general signed code check is used to ensure the security of the cryptographic processing code 304. Further, in some embodiments, the HSM has access to a database 310. The database 310 can be included in the secure storage device(s) 306 or be hosted on a separate computing system, such as a server computer coupled with the HSM 300 through a computer network.

The secure storage device 306 stores one or more cryptographic keys 308 that are controlled by the HSM 300. At a minimum, the HSM 300 can have a single master key 308 that never leaves the HSM 300. In such embodiments, the master key 308 is used to encrypt and decrypt all sensitive data (including other cryptographic keys) so that this data can be securely stored in the database 310 on another computer system, but this secured data cannot be decrypted except in the HSM 300 as the master key 308 stays within the HSM 300. The one or more cryptographic keys 308 can be one or more symmetric cryptographic keys and/or one or more asymmetric cryptographic key pairs, where each key pair has a public key and a private key, which are usable for digital signature processing.

The HSM 300 provides an HSM environment 320 in which cryptographic processing code 304 operates on multiple cryptographic keys to control access to cryptoassets that are managed by the CCS. The HSM 300 can provide cryptographic processing for one or more custodial accounts 330, each account 330 being for one or more customers of the Cryptoasset Custodian. Each account 330 includes two or more vaults 340, where each vault 340 includes multiple private keys 342 useable to access cryptoassets. In some embodiments, the private keys 342 are derived (at least in part) from a Vault ID for each respective vault 340, which helps to enforce the logical separation of the private keys in the respective vaults, thus improving security in the CCS. In addition, each vault 340 has its own associated policy map 350, which defines vault control rules 352 governing which actions are allowed for the vault 340 under one or more specified conditions. The rules 352 of each policy map 350 can include quorum requirements, as described further below, as well as various other permission structures. Note that the policy maps 350 can be updated as well, and so the permission structure(s) and rule(s) therefor can be changed over time.

Each account 330 has an associated cryptographic key 332 that is encrypted by the HSM 300. The cryptographic key 332 is used to secure 360 each policy map 350 for each vault 340 in the associated account 330. In some embodiments, the cryptographic key 332 is a symmetric cryptographic key used by the HSM 300 to encrypt 360 each policy map 350, and the HSM 300 authenticates each policy map 350 by decrypting the policy map 350 using the cryptographic key 332. In some embodiments, the cryptographic key 332 is an asymmetric cryptographic key, where the private key portion of the key 332 is used by the HSM 300 to digitally sign 360 each policy map 350 when it is first created (or updated), and the HSM 300 authenticates each policy map 350 by confirming the digital signature of the policy map 350 using the public key portion of the key 332.

Regardless of the type of key 332, the HSM 300 only allows use of a private key 342 in a vault 340 when the requested action conforms to the rules set forth in the vault's associated policy map 350 and only when that policy map 350 has been authenticated by the HSM 300. When both conditions are met, the HSM will effect the requested action. In some cases, effecting the requested action involves digitally signing some data using the private key 342 (e.g., to effect a withdrawal of a cryptoasset). In some cases, effecting the requested action involves using the cryptographic key 332 (e.g., encrypting or digitally signing an updated policy map 350).

In some embodiments, the HSM 300 stores multiple cryptographic keys (e.g., all the cryptographic keys) that are kept secure by the HSM 300. Thus, the HSM 300 can store all the private keys 342 for each of the vaults 340. However, to reduce the amount of storage space required by the HSM 300, in some embodiments, a key derivation function (KDF) is used to derive 365 the private keys 342 on the fly, as they are needed. The KDF is a deterministic algorithm used to generate the private keys 342 in each respective vault 340 from respective unique identifiers for each vault 340. Thus, as shown, a key 342 is derived 365 using a KDF that takes vault ID "A" as input. Note that, regardless of whether or not the private keys 342 are generated only when needed (or stored), the process of using the Vault ID to derive the private keys 342 for each vault 340 forces the logical separation of the vaults 340 and ensures that private keys 342 cannot be shared between vaults 340. In addition, each cryptoasset in a vault can have one or more private keys 342 produced for that cryptoasset.

Moreover, the KDF can also use other information as input to help improve security in the CCS. For example, the KDF can use the cryptographic key 332 and the Asset ID as input, in addition to the Vault ID, as shown in FIG. 3A. Additional or different inputs can also be used with the KDF. Moreover, the HSM 300 and/or other HSMs in the CCS can each use different KDFs to further increase security in the CCS. Examples of KDFs that can be used include HKDF, PBKDF2, and scrypt. In general, a KDF takes input key material (e.g., an Organization key) and one or more deterministic identifiers (e.g., Vault ID and Asset ID). Further, in the case of on-the-fly creation of the private keys 342, as each private key 342 is regenerated for use in effecting an action (e.g., to digitally sign at least a portion of a request to withdraw a cryptoasset), once the action has been effected (e.g., sending resulting digital signature data to a blockchain network, either directly or through an intermediary) the private key 342 is deleted from memory entirely. Thus, the private keys 342 only exist in the HSM 300 for the times in which they are needed.

Further, one or more additional levels of key indirection can be used. For example, the HSM 300 can store its master cryptographic key 322, and when the cryptographic key 332 is first created by the HSM 300, this key 332 can be encrypted using the master key 322. This will allow the cryptographic key 332 to be stored (in encrypted form) in other computers and still remain secure, as the cryptographic key 332 can only be decrypted by the HSM 300 using its master key 322. Note that in some embodiments, the master key 322 is specific to the individual HSM, and in other embodiments, the master key 322 is shared among two or more HSMs (or potentially shared by all the HSMs) in the system to increase HSM availability for processing requests. Further, in some implementations, the cryptographic key 332 is a public-private key pair, only the private key 332 of the pair is encrypted with the master key 322, and the public key 332 of the pair is regenerated on the fly, as needed, from the decrypted private key 332 of the pair. Moreover, in some embodiments, a separate cryptographic key 332 is generated for each vault 340 in each custodial account 330 using the Vault ID to derive each respective cryptographic key 332, which forces the logical separation of the vaults 340 up to the level of the cryptographic key 332, and ensures that cryptographic keys 332 cannot be shared between vaults 340.

Additional Security Measures for the CCS

Figure 3B:
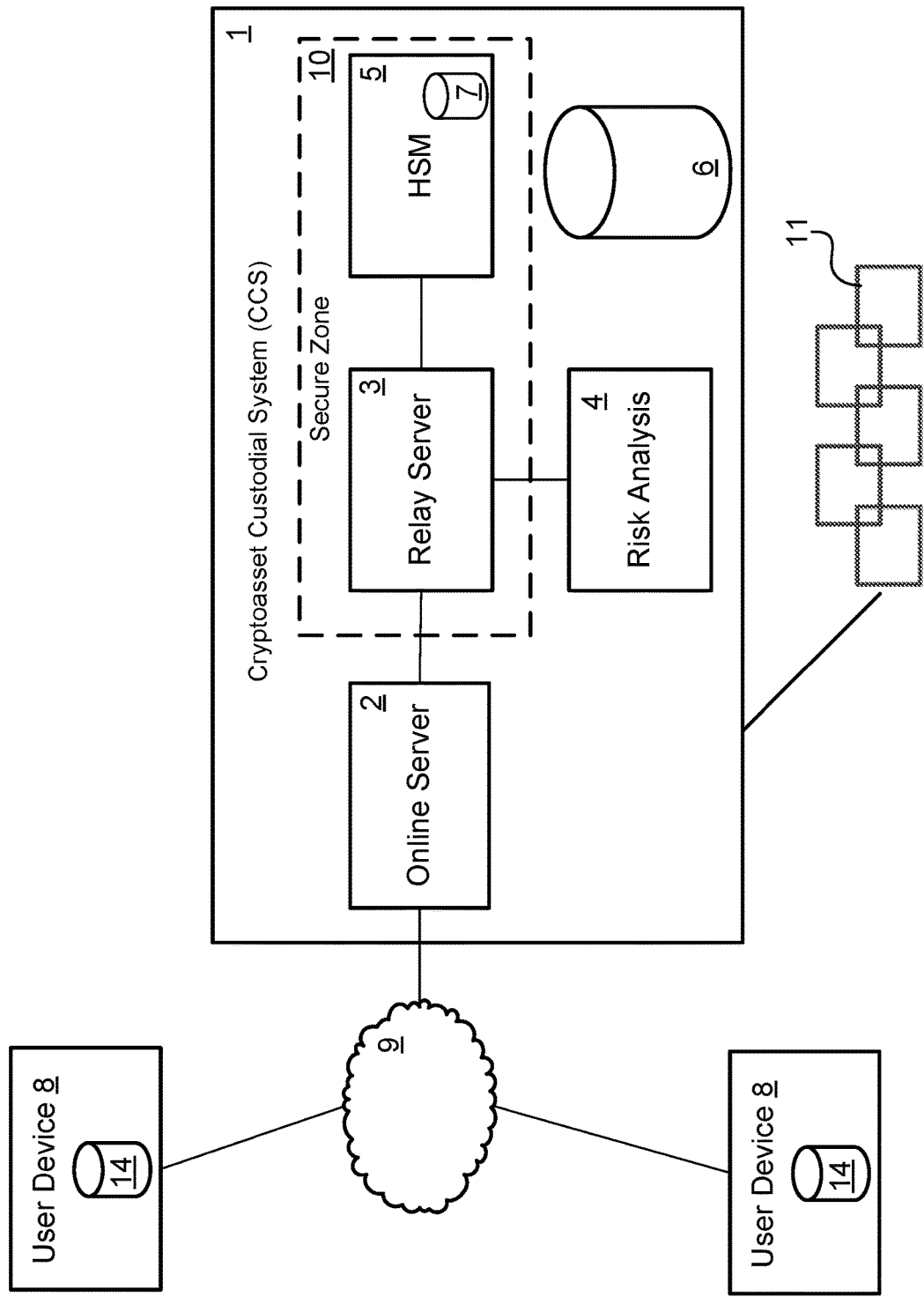
FIG. 3B is a block diagram showing an example of a CCS.

As noted above, the HSM 300 can be employed in a larger CCS, which can include additional HSMs and can employ additional systems and techniques to improve security. FIG. 3B shows a block diagram of an example of a CCS. In the shown embodiment, the CCS 1 includes an online server 2, a relay server 3, a risk analysis stage 4, an HSM 5, e.g., implemented as HSM 300, and a data storage facility 6. The data storage facility 6 may include one or more databases, e.g., database 310 or database 100, which can be or include relational databases or any other type of mechanism for storing data in an organized way, where the data may be structured data and/or unstructured data. The HSM 5 also includes its own internal secure storage facility 7, e.g., secure storage device 306. Note that there can be multiple instances of each of the above-mentioned components in the CCS 1, even though only one of each is shown to simplify description. One or more user devices 8, also called clients, can communicate with the CCS 1 via a public computer network 9, such as the Internet. Each of the user devices may be any one of, for example, a smartphone, tablet computer, laptop computer, desktop computer, or the like. Each user device 8 may include a secure enclave 14, such as an iOS-based secure enclave, which is used to store the corresponding user's private key and to generate digital signatures of that user. In at least some embodiments, each user device 8 is associated with a different user, and this description henceforth assumes such an embodiment to facilitate description. Note, however, that it is possible to have embodiments in which multiple users share the same user device 8.

The relay server 3 functions as a virtual air gap to isolate the HSM 5 from the public computer network 9. The relay server 3 and HSM 5 operate within a secure zone 10. The HSM 5 may physically reside in a physically secured datacenter with no direct access to any outside network. Messages between the HSM 5 and the online server 2 are routed on a half-duplex (outbound request-responses only) connection to the relay server 3 in the secure zone 10. The relay server 3 disconnects itself from the secure network while communicating with the online server 2, and disconnects itself from all external networks while communicating with the HSM 5, such that no interactive sessions with those devices can be established from the outside. This provides virtual air gap security to critical infrastructure. Moreover, in some implementations, the air gap is not just virtual, but is a physical air gap, e.g., a physical switch between the relay server 3 and any outside networks (e.g., the Internet) and/or a physical switch between the relay server 3 and the HSM 5, where each physical switch is driven by the relay server 3 or by a dedicated switching host.

In some embodiments, the CCS 1 also has access to at least one blockchain network 11 corresponding to cryptoassets of which the CCS 1 has custody. Access to the blockchain network 11 may be via the public computer network 9, e.g., the Internet.

In some embodiments, each transaction submitted by a customer of the CCS 1 will go through the risk analysis stage 4, which may be partially or fully automated. For example, with some embodiments of the CCS 1, a human risk analysis agent may evaluate the output of automated risk analysis software displayed on a risk review dashboard, to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk score that might lead to the transaction being approved or more information being requested.

Deposits

Figure 4A:
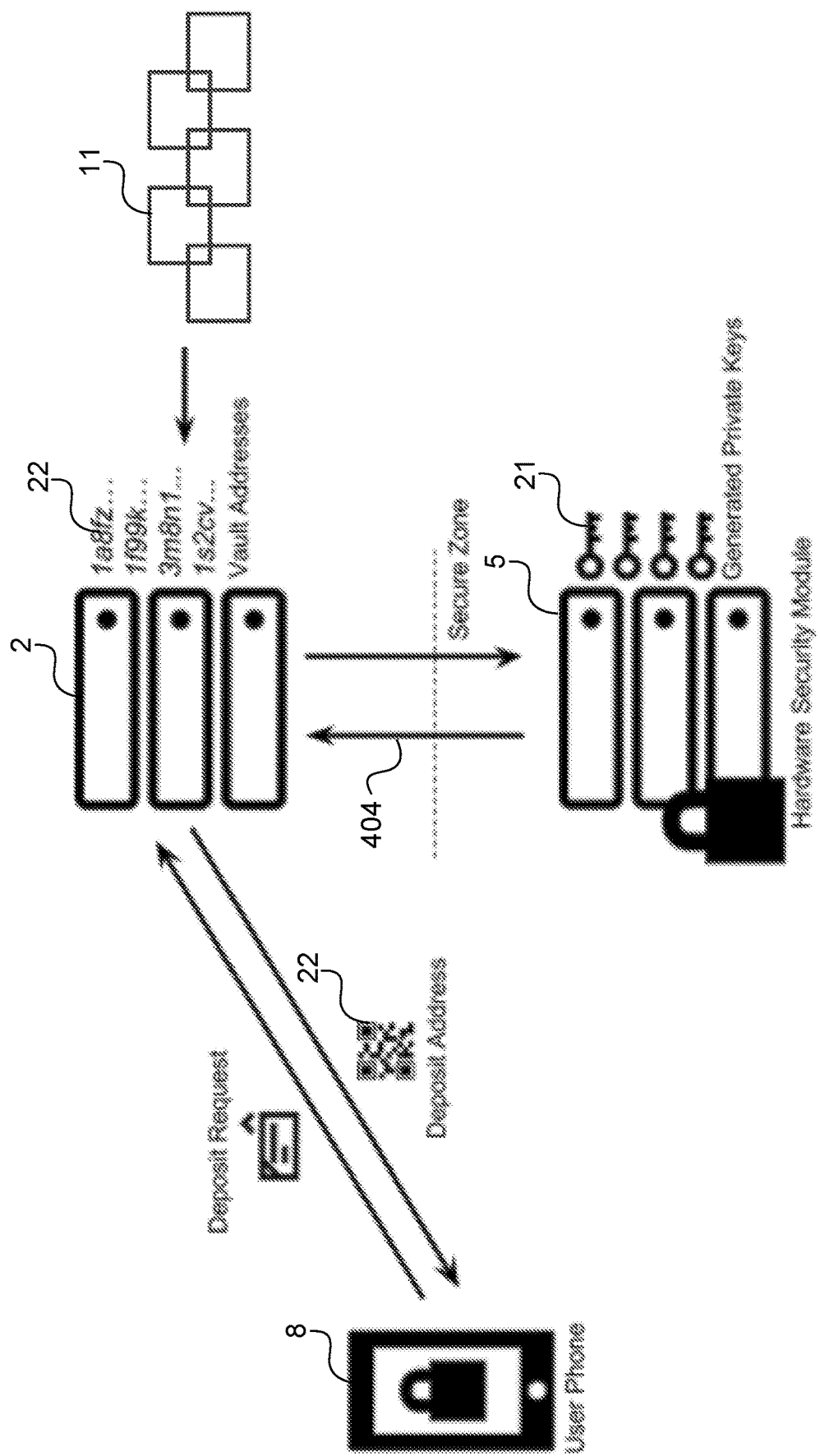
FIG. 4A is a schematic diagram showing an example of a deposit process flow with the CCS.
Figure 4B:
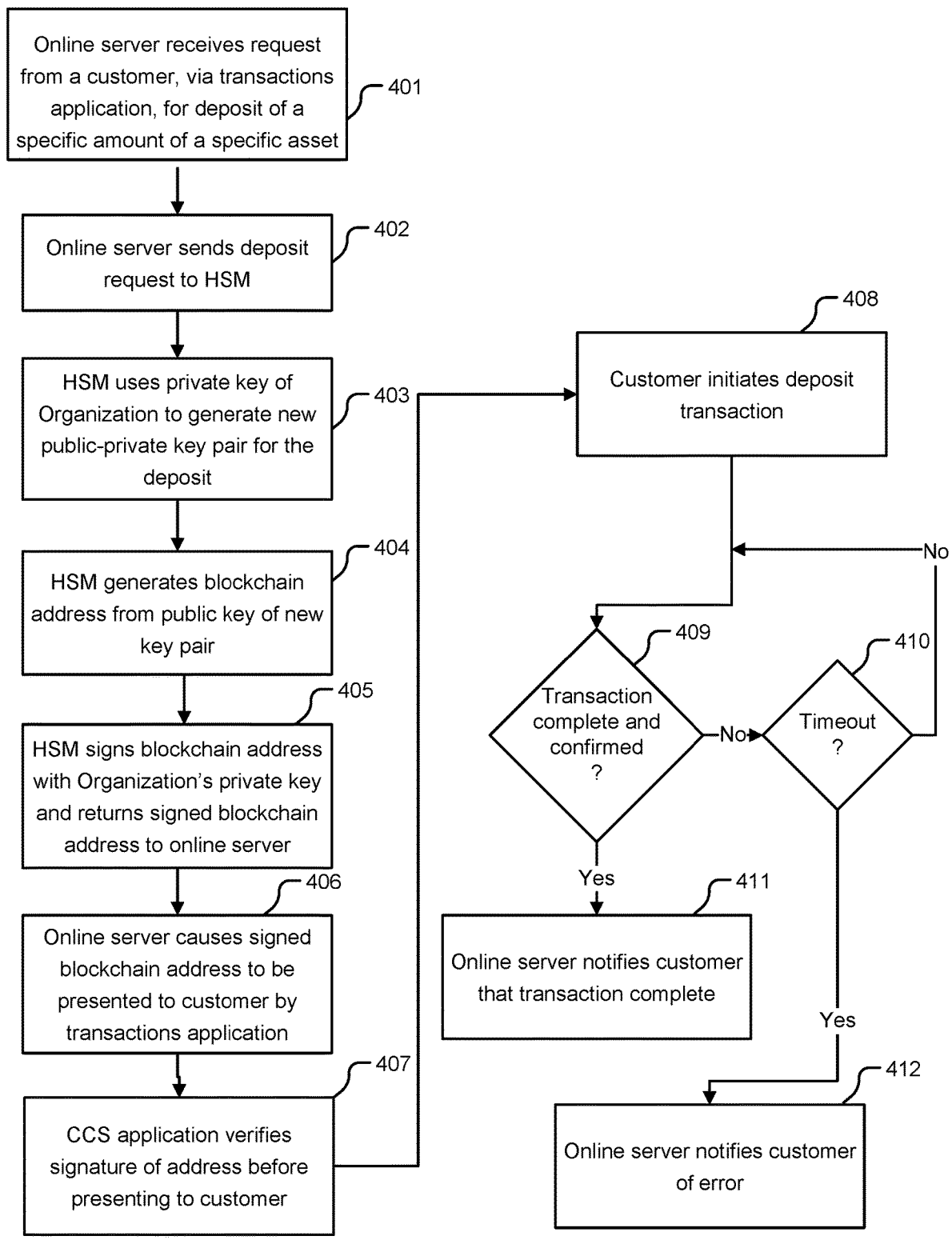
FIG. 4B is a flow diagram showing an example of the deposit process flow.

Refer now to FIGS. 4A and 4B, which show an example of the process of depositing a cryptoasset, such as an amount of cryptocurrencies, with the CCS 1. Deposits are initiated by a customer via the Internet through a software application (hereinafter "the CCS application") (not shown) executing on a user device 8 of the customer. This can be done by the customer's selecting an asset type and requesting a deposit for a given amount in the CCS application. Once initiated, the request for a blockchain deposit address is then sent to the online server 2, which receives 401 the request and forwards 402 it via the relay server 3 to the HSM 5 (which as noted above is isolated from the Internet by the relay server 3). The HSM 5 then generates 403 a new public-private key pair 21 to correspond uniquely with the deposit, i.e., to correspond with the requested blockchain address. In some embodiments, the HSM 5 uses the private key of the relevant Organization and a KDF to generate the new key pair for the blockchain address. An "Organization" in this context is a data structure that corresponds to a particular customer, as discussed herein. The private key of the newly generated key pair cannot be extracted from the HSM 5, but can be backed up securely in an encrypted file. Key generation inside the HSM 5 ensures that the private keys 21 only exist within the HSM 5, are not available anywhere else in the world and cannot be accessed by any entity that is external to the HSM 5.

The HSM 5 next generates 404 the blockchain address for the deposit from the public key of the newly-created key pair. This can be done by using a well-known blockchain-specific transformation of the public key of the blockchain address. The HSM 5 then signs 405 the blockchain address with the Organization's private key and returns the signed blockchain address to the online server 2. The online server 2 then causes 406 the signed blockchain address 22 to be sent to the customer's user device 8, to cause the user device 8 to present the address to the customer in the CCS application on a user device, in an easy-to-consume format (e.g., as a QR code), for use as a destination address in a blockchain transaction. The CCS application on the user device verifies 407 the signature of the address before presenting the address to customer.

The customer's user device 8 uses the public key of the Organization (which it previously received from the CCS 1 and locally stored) to verify the authenticity of the blockchain address it receives from the CCS 1. The customer then initiates 408 a transaction to deposit assets into the CCS 1. The transaction might be initiated from an exchange, from the customer's personal wallet, or from another cryptoasset store. No confirmation is required for the assets to show up in the CCS 1.

The address of the deposit is stored in a collection with other addresses belonging to the customer in the CCS 1, known as the customer's vault. A vault in this context is a data entity that contains assets and a policy map containing one or more policies governing deposits and withdrawals from those assets. A cryptoasset is represented as a slot inside a vault that can hold an amount of an asset type (e.g., Bitcoin, Ethereum). Once under custody and stored with the CCS 1, an asset is completely under the control of the CCS 1.

The online server 2 determines whether the customer has confirmed the transaction within the defined time period 409, 410. Once the deposit transaction is confirmed by customer and confirmed on the blockchain, the customer is so notified 411 by the online server 2, and the assets are considered to be under custody of the CCS 1. In the event confirmation is not received within the defined time period, the online server notifies 412 the customer of an error in the transaction.

Withdrawals

Figure 5A:
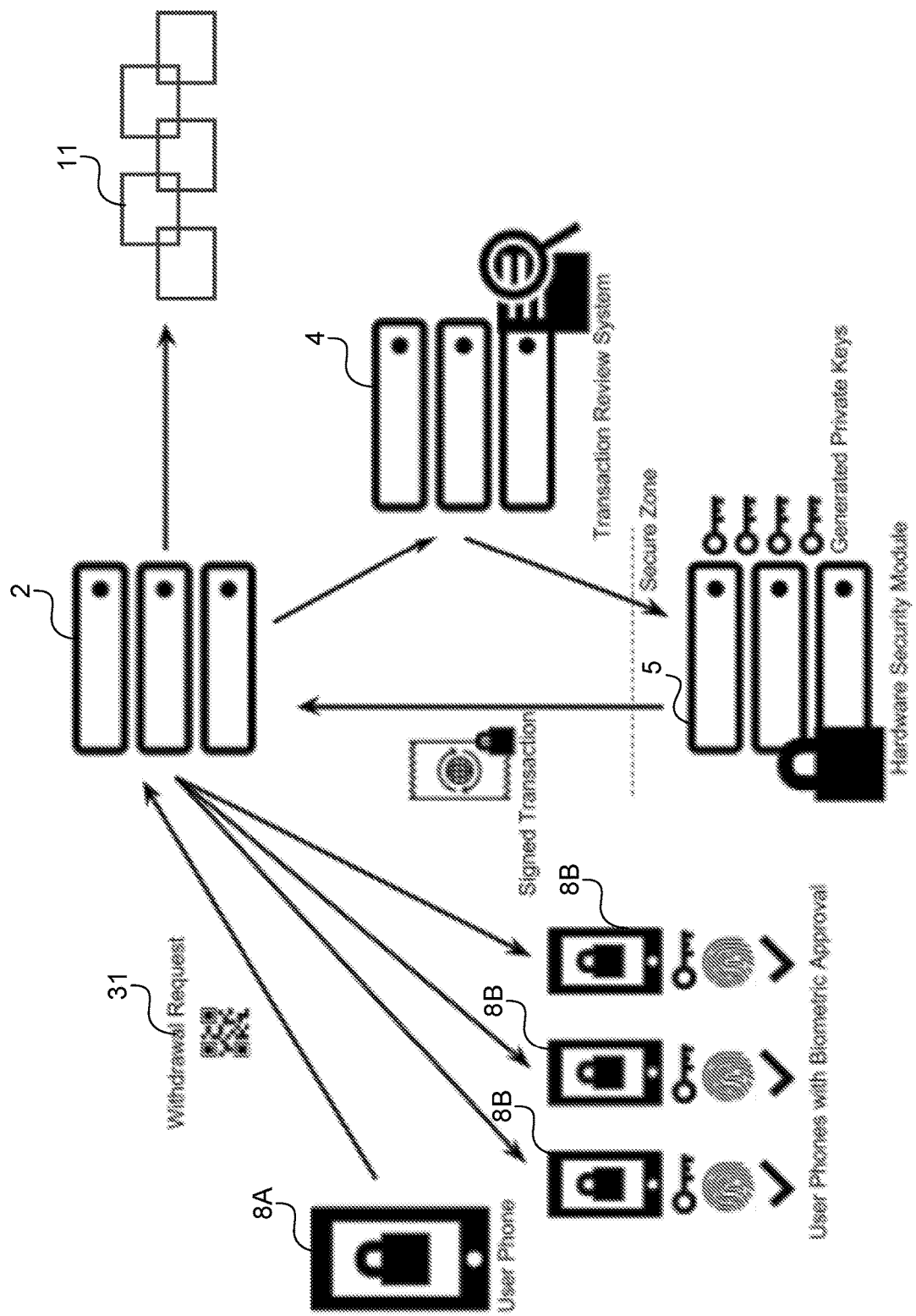
FIG. 5A is a schematic diagram showing an example of a withdrawal process flow with the CCS.
Figure 5B:
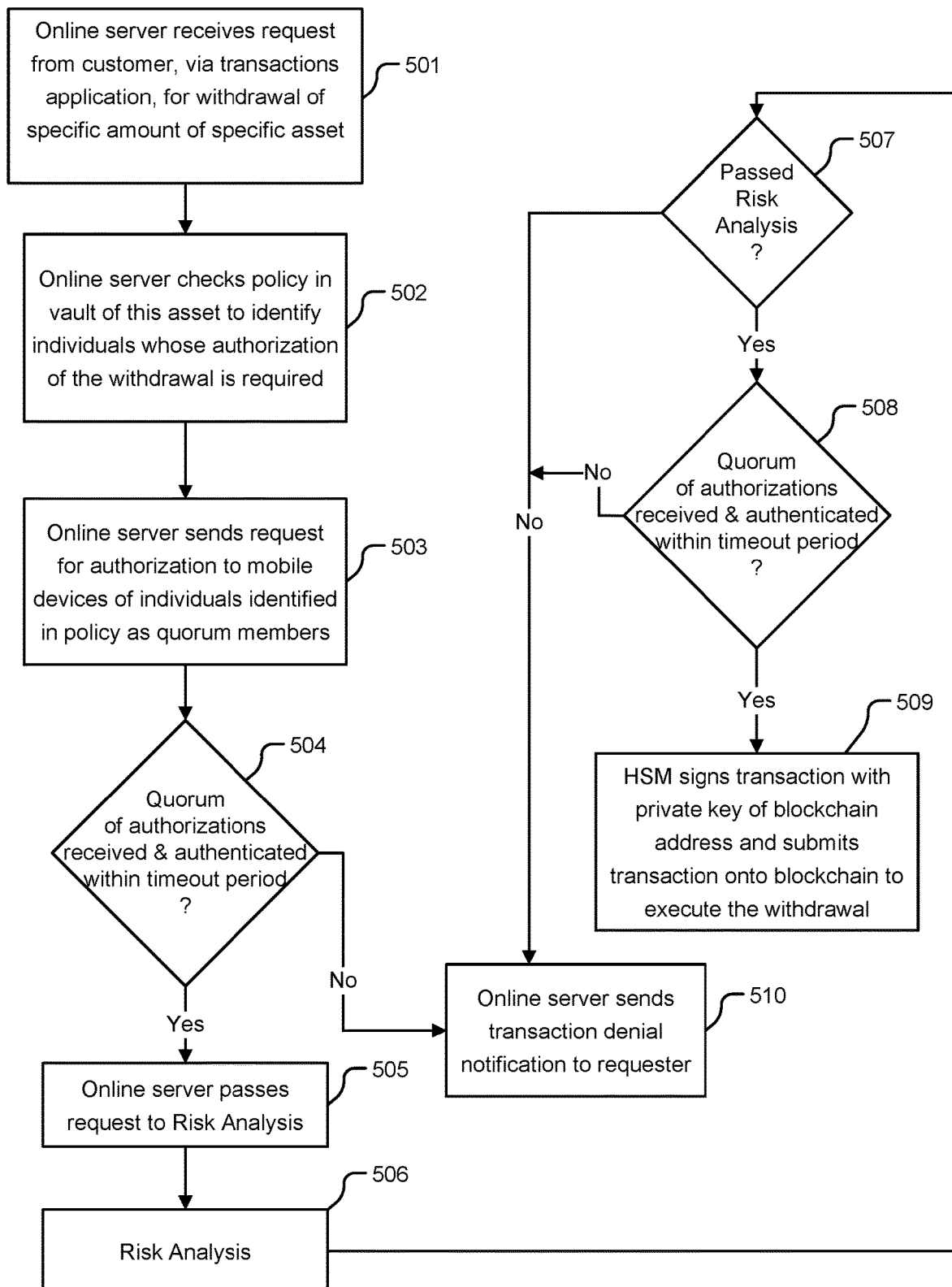
FIG. 5B is a flow diagram showing an example of the withdrawal process flow.

FIGS. 5A and 5B show an example of the process of withdrawing an amount of a previously deposited cryptoasset, such as cryptocurrency. Withdrawals can be initiated from the CCS application on a user device 8A by selecting a specific cryptoasset to withdraw and an amount. Once initiated, all authorizing parties are made aware of the withdrawal request and are required to authorize it individually on their mobile devices 8A and 8B.

During this process users are required to review the transaction and approve it, where each user's approval is subject to biometric authentication (e.g., fingerprint, facial recognition and/or voice recognition). In some embodiments, before a withdrawal can successfully move on to the next phase, every request is sent to the risk analysis stage to be inspected for suspicious activity and authorized as legitimate. The HSM 5 validates that a defined quorum (e.g., a majority) of users authorized the transaction, and that the transaction was approved by the risk review stage 4. For example, for a given corporate customer that has five distinct employees who require the ability to transfer funds, a suitable quorum configuration might be to have a group of three of those five employees be necessary to move any funds. The HSM 5 then proceeds with the signature and submission of the asset-moving transaction to the blockchain 11.

An example of the withdrawal process is further shown in FIG. 5B. The online server 2 initially receives 501 the withdrawal request 31 from the customer. The online server 2 then checks 502 the approval policy for the cryptoasset that is the subject of the transaction, as indicated in the vault of the cryptoasset, to determine which individuals' authorizations (endorsements) may be used to satisfy a quorum to approve the withdrawal. The online server 2 then sends 503 endorsement requests to the mobile devices 8A, 8B of those individuals (the mobile devices have been previously registered with the CCS 1). In response to these requests, one or more endorsement messages may be received from users' mobile devices 8A, 8B, where the endorsement messages were signed locally by the users' respective private keys stored securely in their respective mobile devices and subjected to one or more biometric authentication techniques, as described further below. Accordingly, the online server 2 determines 504 whether, within a timeout period, a quorum of authorizations have been received and the corresponding authorizing parties have been authenticated, as specified in the policy for this cryptoasset. If so, the online server 2 passes 505 the transaction request 31 to the risk analysis stage 4. Otherwise, the online server sends 510 a transaction denial notification to at least the user who requested the transaction (and possibly to all other users identified in the policy for this cryptoasset).

The risk analysis stage 4 performs a risk analysis 506, which as noted above may be fully or partially automated, or in some embodiments may be performed entirely by one or more human beings (based on computer output data). If the transaction passes risk analysis 506, then control flow is passed to the HSM 5, which verifies 508 that the quorum requirement has been satisfied, by performing the same determination as determination 504 or a similar determination, as does the risk analysis 506 (described further below). If satisfaction of the quorum is verified by the HSM 5, the HSM signs the withdrawal transaction with the private key of the blockchain address and submits the transaction onto the blockchain 11 to execute the withdrawal 509. Otherwise, the HSM 5 signals a failure to the online server 2, which in response sends 510 a transaction denial notification to at least the user who requested the transaction (and possibly to all other users identified in the policy for this cryptoasset).

User Authentication

As mentioned above, when a user endorses a transaction request, they are subjected to one or more forms of authentication by their mobile device and/or the CCS 1, to establish that they are the expected person taking the action. These authentication forms may include one or more biometric authentication techniques, such as fingerprint verification, voiceprint verification, speech recognition, facial recognition and/or gesture recognition. The user's mobile device (e.g., smartphone) may perform one or more of these authentication techniques.

Additionally, or alternatively, the user may be required to upload to the CCS 1 a video, captured by their mobile device, from which their identity can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the CCS 1 may generate a random number that can be used to select a few (e.g., three to five) words from a set of known words. The CCS 1 may present those words to the user and have the user speak them in a video captured by the user's mobile device, which the user's mobile device then transmits to the CCS 1. When reviewing the transaction, the reviewing mechanism or a human reviewer can independently generate the expected words based on transaction data and verify that the user spoke those words. The video can also be subject to facial and/or voice recognition. By performing this type of deterministic challenge generation, an attacker can be prevented from faking a transaction by capturing and reusing previously transmitted authentication videos from the user.

HSM Logic

The main role of the HSM 5 is to verify the validity of operations. The HSM 5 carries out the will of the signers and authenticates that the signers are the authorized parties of an operation through the HSM's privileged access to keys. Keys needed for signing transactions can be stored securely in the HSM 5 and never leave it. In some embodiments, the HSM 5 enforces these policies through a Secure Execution Environment (SEE) that runs code that cannot be changed except through physical access to the HSM 5 and requires a set of smartcards held securely by multiple employees of the Cryptoasset Custodian.

In some embodiments, to facilitate the above-mentioned functionality the HSM 5 stores, in its internal storage 7 multiple instances of a data structure called "Organization," i.e., one instance for each customer of the Cryptoasset Custodian. The Organization data structure may contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user, change vault policy, etc.). An Organization is signed by the HSM, using the Organization's private key (which is stored in the HSM 5 and cannot be read by any external entity), to indicate that it was produced through a valid set of changes authorized by the users and risk reviewers. The HSM keeps track of the most recent version to prevent rollback attacks.

To onboard a new customer, the HSM 5 creates a new Organization instance. To help ensure adequate security, the HSM 5 may create the Organization with the requested set of users already in it. In some embodiments, the HSM 5 must generate new unique keys for every new Organization created this way. This prevents an attacker from asking the HSM 5 to generate a "new" organization that has the same ID as an existing one and tricking users into trusting it instead.

Furthermore, as noted above, the HSM 5 can be implemented as HSM 300, or similarly, the HSM 300 can be implemented as HSM 5 in CCS 1. Thus, HSM 5 need not store the private keys 21 in the internal secure storage facility 7, but rather can regenerate the private keys 21, as needed, in some embodiments. Likewise, the HSM 5 need not store the Organization's private key in the internal secure storage facility 7, but rather can regenerate the Organization's private key, as needed, in some embodiments. Similarly, the HSM 5 need not store the Organization data structure in the internal secure storage facility 7. In some embodiments, the Organization data structure is digitally signed by the Organization's private key, which in turn is encrypted using the HSM's master key, and so the encrypted private key of the Organization and the Organization data structure can be stored elsewhere and provided to the HSM when needed for processing by the HSM.

Figure 6:
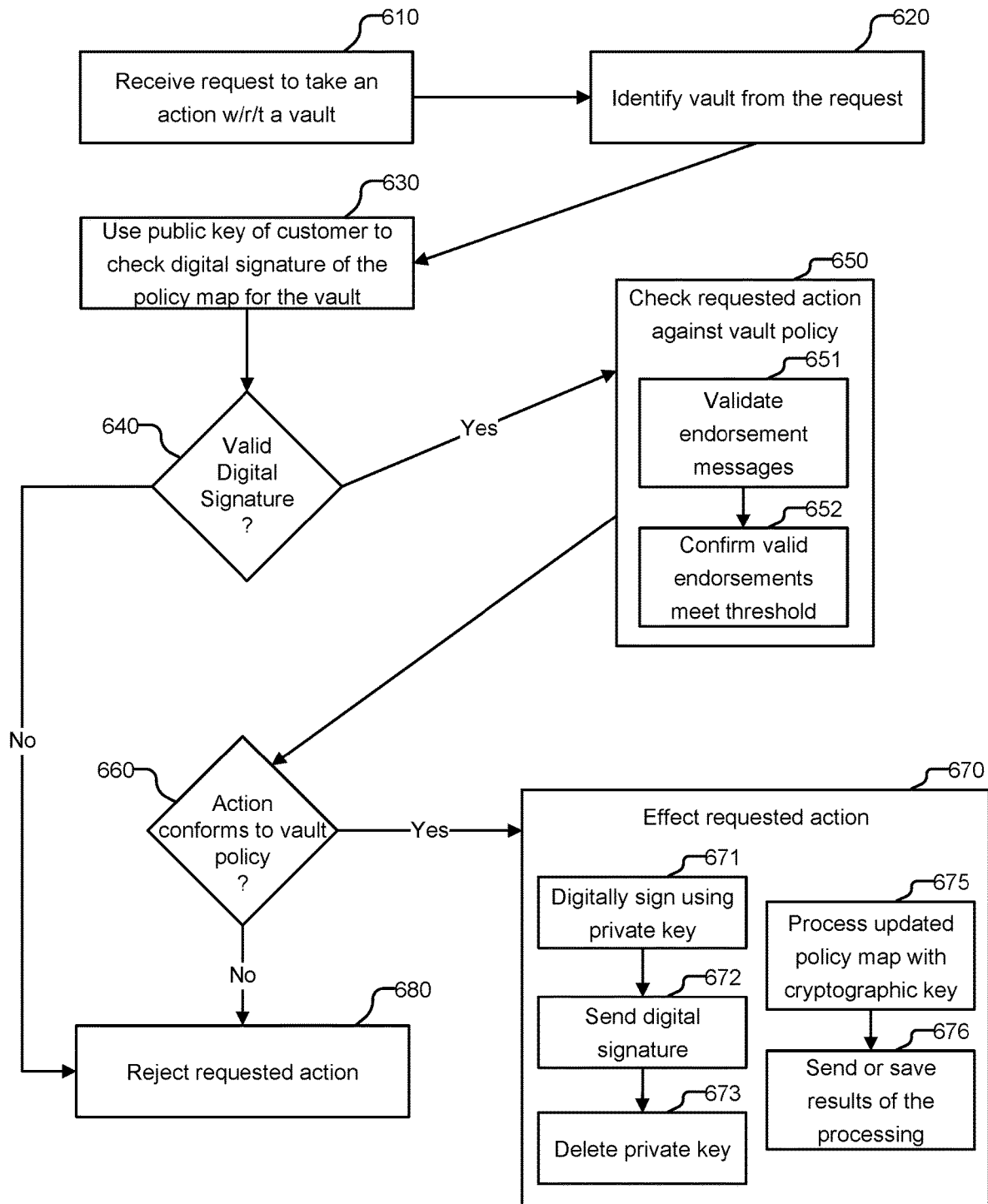
FIG. 6 is a flow diagram showing an example of a process performed by an HSM in connection with a requested operation.

FIG. 6 is a flow diagram showing an example of a process performed by an HSM 5, 300 in connection with a requested operation (also referred to as a requested action). A request is received 610 to take an action with respect to a vault of multiple different vaults in a cryptoasset custodial system. As described above, the multiple different vaults are logical groupings of cryptoassets associated with a user (e.g., a customer and/or customer's employee and/or retail customer) of the cryptoasset custodial system. In some embodiments, the request includes additional information needed by the HSM 5, 300 to process the request, such as a policy map for a vault, e.g., in an Organization data structure. Moreover, various types of requested actions are possible, including deposits, withdrawals, transfers, policy updates, etc. Further, requests to use the key can include details about what exactly is being signed. For instance, for a withdrawal, the system can validate the user signed the destination address, the amount being sent, and the fee being used, as well as the hash of the actual transaction so it can't be replayed. The HSM deserializes the transaction and ensures that all of the user's intended values match what's there.

A vault is identified 620 from the received request. This can involve extracting a Vault ID from the request itself, or determining a Vault ID from other information in the request. For example, the request can include an Asset ID, which the HSM can use to look up the Vault ID in a database. Other information used by the HSM, such as a public key of a customer that owns the vault, can be extracted from the request or be determined or derived from information in the request.

The public key of the customer that owns the vault is used 630 to check a digital signature of a policy map for the vault. The digitally signed policy map can be stored on the HSM, provided to the HSM along with the request, or obtained by the HSM in response to the request. In any case, the digital signature of the policy map is checked before the HSM allows the requested action to proceed with respect to the vault.

If the digital signature is not valid 640, the requested action is rejected 680. If the digital signature is valid 640, the requested action is checked 650 against one or more policies specified by the policy map for the vault. As described above, various rules can be defined by the policy map, including quorum requirements. Thus, in some embodiments, the check 650 includes validating 651 endorsement messages from at least a subset of individual users of the cryptoasset custodial system, as specified by the policy map, and confirming 652 that the number of valid endorsements meets a threshold, as specified by the policy map. Validating 651 the endorsement messages can include checking cryptographic digital signatures using public keys corresponding to the subset of the specified individual users. Further details of examples of such quorum-based policies are described in connection with FIGS. 5A, 5B and 7.

If the requested action does not conform 660 to the rules of the policy map for the vault, the requested action is rejected 680. If the requested action does conform 660 to the rules of the policy map for the vault, the requested action is effected 670 by the HSM. Note that amount of processing 670 performed by the HSM can vary with the action requested and the details of implementation in various embodiments. At a minimum, the HSM will perform at least one cryptographic processing operation and then send and/or save a result of this processing to effect 670 the action.

For example, the HSM can digitally sign 671 some data (e.g., at least a portion of the request) using a private key (e.g., a cryptoasset private key) and then send 672 the digital signature to an appropriate recipient (e.g., to a blockchain network) for further processing. In addition, if the HSM regenerates private keys as needed, the HSM can then delete 673 the private key used in the digital signature process. Note that while a KDF approach to key generation is described, the cryptographic keys can be generated in other manners and stored on the HSM(s). As another example of an action, the HSM can process 675 an updated policy map with a cryptographic key (e.g., encrypt the updated policy map with a symmetric key of the customer, or digitally sign the updated policy map with a private portion of an asymmetric key of the customer) and then send or save 676 the results of this processing. In some embodiments, the HSM also updates the policy map itself based on received instructions, and in some embodiments, the HSM receives the updated policy map along with the request to authorize and secure the update. Other actions, policies, and additional security measures can also be employed.

Figure 7:
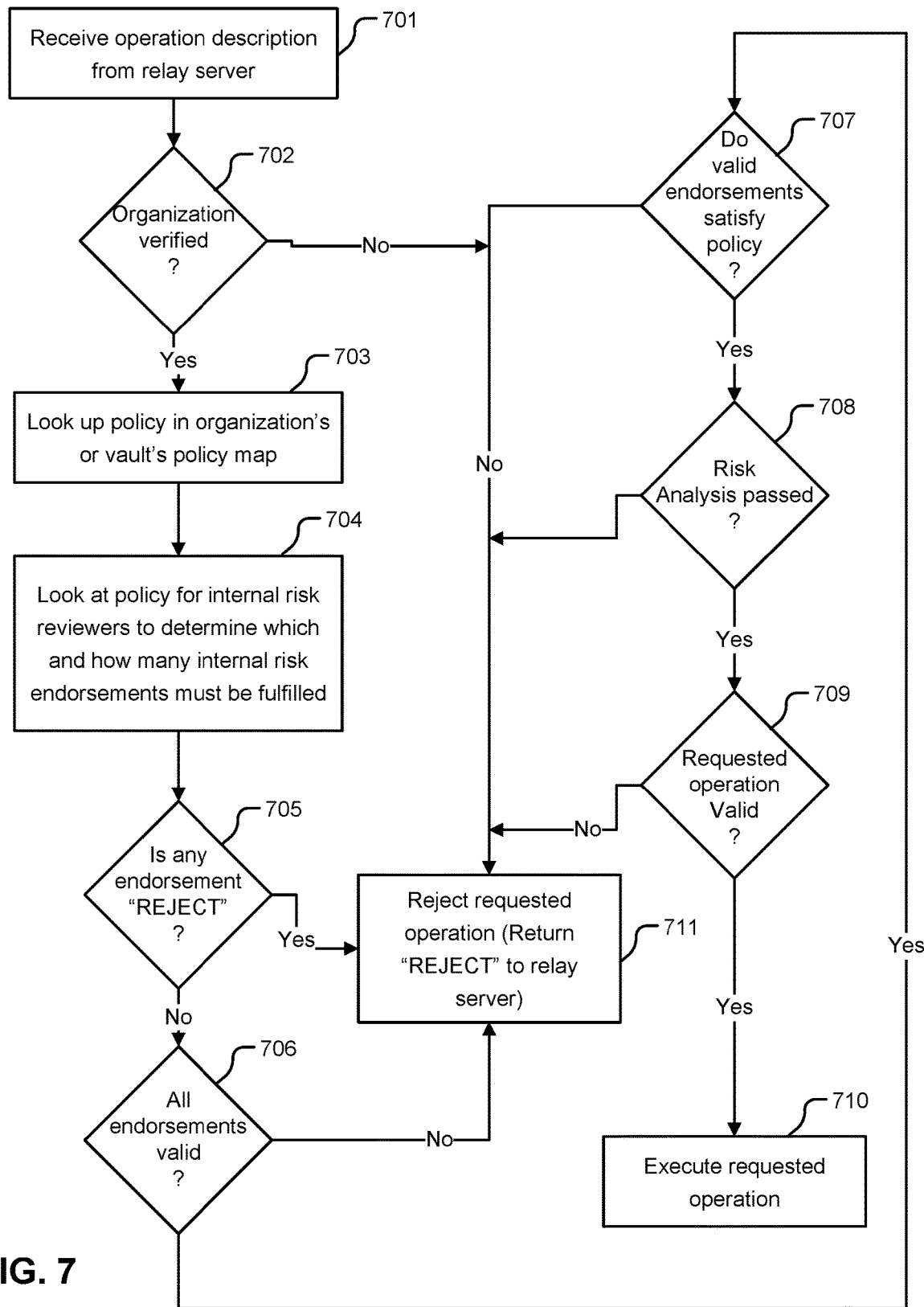
FIG. 7 is a flow diagram showing an example of another process performed by an HSM in connection with a requested operation.

FIG. 7 shows an example of a process that may be performed by the HSM 5, in at least some embodiments, in response to a request to carry out an operation. The request may be received by the HSM 5 from the relay server 3. Initially, the HSM 5 receives 701 from the relay server 3 an operation description, which specifies an Organization. The operation description is a set of data and metadata describing a requested operation, such as a requested deposit, withdrawal or transfer of cryptocurrency. The HSM 5 then verifies 702 the integrity of the specified Organization.

The HSM 5 then looks up 703 the policy in the Organization's or the vault's policy map. It then looks at the policy for internal risk reviewers to determine 704 which and how many internal risk endorsements (i.e., endorsements by personnel of the Cryptoasset Custodian) must be fulfilled. Next, the HSM 5 determines 705 whether any of the received endorsements (from users) indicates to "REJECT" the requested operation. If so, the HSM 5 rejects 711 the requested operation, by returning a "REJECT" message to the relay server, which then returns a corresponding "REJECT" message to the online server, to cause notification to the requester. In this case, the HSM 5 does not bother checking the signatures and just rejects the operation.

The HSM 5 then determines 706 whether all of the received endorsements for the transaction are valid. This includes verifying the validity of the endorsements provided by checking that: i) the user is in the Organization, ii) the signature is correct for the specified operation, and iii) each of the signatures has an "APPROVE" decision. If not all of the received endorsements for the transaction are valid, the process proceeds to rejection 711 as described above.

If all received endorsements for the transaction are valid, the HSM 5 then determines 707 whether the endorsements satisfy the relevant policy for the subject cryptoasset (i.e., satisfy the specified quorum). If the valid endorsements do not satisfy the policy, the process proceeds to rejection 711 as described above. If the endorsements satisfy the policy, then the HSM 5 determines 708 whether the requested operation passed the risk analysis stage. If not, the process proceeds to rejection 711 as described above. If the requested operation passed the risk analysis stage, the HSM 5 determines 709 whether the requested operation is valid. This can include verifying that the operation is internally consistent and that the operation can be applied to the Organization, vault or asset that it targets. If the requested operation is not valid, the process proceeds to rejection 711 as described above. Otherwise, the HSM 5 executes 710 the requested operation (or triggers an action to cause it to be executed). An operation to change the Organization, vault or policy results in a new signed Organization data structure with a higher generation value and the change applied to it. An operation to withdraw assets results in the HSM 5 signing a blockchain transaction with the private key corresponding to the subject asset. An operation to deposit assets results in the HSM 5 generating a deposit address.

Offline Device Endorsements

As a method for reducing the risk for users interacting with the CCS application on their personal devices, the CCS 1 may require authorization from an offline device. This device, such as a consumer phone with secure enclave or similarly capable computing device such as an iPod Touch, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the CCS application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. This can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the online server of the CCS 1.

Figure 8:
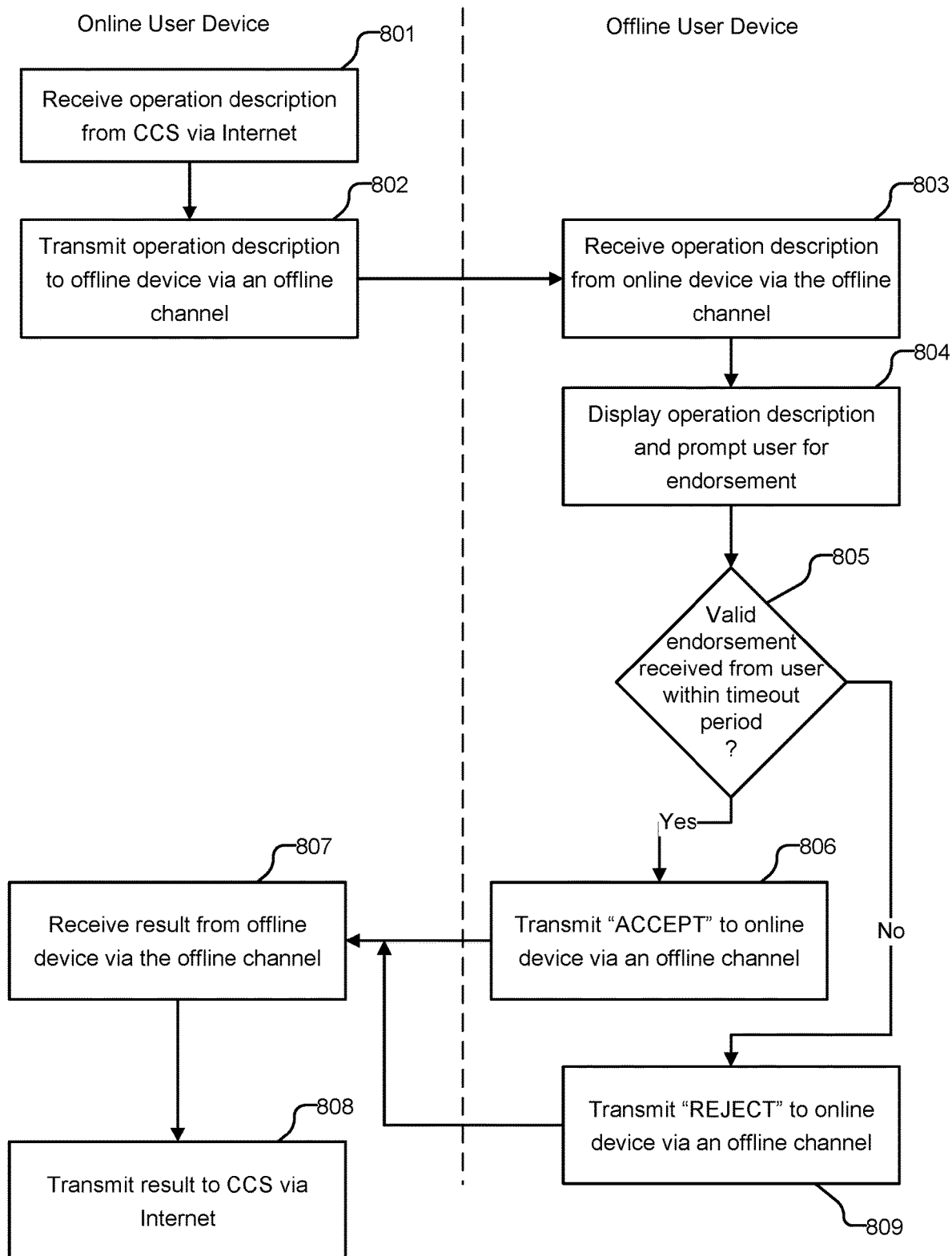
FIG. 8 is a flow diagram showing an example of a process for using an offline user device to endorse a requested transaction.

FIG. 8 is a flow diagram that further shows this process, according to some embodiments. An online user device receives 801 an operation description from the CCS via the Internet. The online user device then transmits 802 the operation description (or a portion thereof) to the offline user device file an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives 803 the operation description from the online user device via the offline channel, and based on the information thereby received, displays the operation description (or portion thereof) and prompts 804 the user for endorsement of the operation. If a valid endorsement is received 805 by the offline device as user input within a timeout period, the offline device transmits 806 an "ACCEPT" message to the online user device via the same offline channel by which it received the operation description, or via a different offline channel. The online user device then receives 807 the results of the endorsement from the offline device and transmits 808 the result payload to the CCS via the Internet. If a valid endorsement is not received 805 by the offline user device from the user within the timeout period, the offline user device transmits a "REJECT" message to the online user device via the offline channel, which in turn transmits 809 the "REJECT" payload to the CCS via the Internet.

The offline device may be delivered to the user with its secure key pre-enrolled in the Organization, or it may be allowed to be online for the initial enrollment process, or it may send its enrollment through a similar procedure to the authorization process.

The CCS software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online user device, that indicates that the version of the software on the offline device is no longer compatible. Whenever the device is online, it can record as well as attempt to transmit to the CCS 1 the fact that it can access the Internet so that that information may be used to assess risk by the platform at a later time.

In addition to being kept offline, the offline user device and one or more online devices may be restricted to act on a transaction only when in range of a predefined beacon. A wireless (e.g., Bluetooth) beacon device can be made available to the user, and the CCS application may refuse to authorize transactions unless it detects that the beacon is available.

Auditability and Proof of Ownership

Every transaction submitted to the CCS 1 is recorded in an internal ledger that is tamper-resistant and that allows auditors to have cryptographic proof of every historical event on every user's account. The ownership of a blockchain asset is controlled by the possession of the private key corresponding to the public wallet address. The CCS can prove ownership of these assets to auditors by making use of the private key corresponding to a user's vault to sign a string of randomly chosen text chosen by the auditors. Consider the following example:

An auditor wishes to see proof that the CCS has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

{
   Address: 1BvBMSEYstn5Au4m4GFg7yJaNVN2,
   Token: "AUDIT-CHALLENGE-xGG8vQFnd8QDwHz6Uj1GX",
}

The CCS 1 receives the challenge and forwards it to the HSM 5 as a predefined template serialized package. The HSM 5 is programmed to accept and sign such audit requests (which are not arbitrary payloads and therefore are not at risk of being later interpreted as a signed blockchain transaction) with the private key associated with the specified address. The CCS 1 then returns the valid signature for the challenge that can be independently verified by the auditor. This verification proves that the CCS 1 has control over a private key associated with an entry on the blockchain, achieving proof of control of the asset.

Thresholding Service

In some embodiments, the CCS 1 includes a Thresholding Service that enables other parts of the system (Risk Analysis stage 4 and HSM 5) to securely determine that user operations and transactions have followed the customer specific business logic and have been approved by a human/automated risk review system. The Thresholding Service can verify multi-signature (multi-user) quorums to achieve this.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The CCS 1 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 300 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The CCS 1 may also allow thresholding across multiple required groups. For example, in a company a majority of the finance team may be required to sign off, as well as the front office.

In some embodiments, the Thresholding Service implements a fine-grained access control model in its quorum verification, in which different users can have different access levels, which may include the following levels, for example:

View-only
  This is the default access level
  Users in this level can view all asset positions
  Users in this level can flag any transaction
  Users in this level can freeze all assets
View-authorize
  Users in this level can act as an authorizing vote for an action toward a quorum
  Users in this level can view all asset positions
  Users in this level can flag any transaction
  Users in this level can freeze all assets
View-authorize-necessary
  Users in this level are a required vote for an action
  Users in this level can view all asset positions
  Users in this level can flag any transaction
  Users in this level can freeze all assets In some embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In some embodiments, a user's signature is generated from an iOS secure enclave in the user's mobile device, and forwarded to the CCS 1 by the iOS application programming interface (API) component in the user device 8. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the Risk Analysis stage to be further analyzed before sign-off by the Risk Analysis stage, and will serialize the signature data into a payload to be consumed by the HSM signing service. Each additional signature provided to the Thresholding Service and verification can be recorded in the append-only log service. This will provide additional auditing and status updates in addition to the metadata captured in the Thresholding Service's storage, which will be essential for providing consumable updates to user clients.

Maintaining Quorum Liveness

It is assumed that authorized members of a quorum are available to cryptographically sign transactions. Therefore, the quorum should be kept "live"—that is, at any given time, the CCS 1 has reasonable confidence that all potential members of the quorum maintain possession of their secure device keys and can actively participate in a transaction. In some embodiments, the CCS 1 can do the following to achieve this level of confidence:
  1. Have access to the set of user public keys required to fulfill a policy's quorums.
  2. Set a liveness threshold for a policy, i.e., the amount of time after which one considers a key to be at risk of unavailability. This can be fixed or related to normal transaction cadence.
  3. Require users to periodically sign a proof transaction with their private keys. This can be explicit as a liveness check or hidden/implicit by requiring their key for routine operations such as login.
  4. Record the latest live time of any one or more users' keys.
  5. Continuously monitor whether any user's live time has exceeded the liveness threshold.
  6. Use the above information to prompt the user to prove they still have access to their signing key and/or inform other users that the quorum may be at risk.

Risk Analysis Stage

The Risk Analysis stage 4 can implement an API, called the Risk API, and can further include human review of all transactions and administrative user operations. In some embodiments the Risk API drives the human review system. The Risk API can provide integration with an internal risk dashboard, for human employees of the Cryptoasset Custodian to manually review each transaction.

In some embodiments, all transactions are manually approved by designated employee(s); all administrative user operations (adding, removing, permission changes) are manually approved by designated Cryptoasset Custodian employee(s); reviewable entities must have passed an automated verification process before requiring risk analysis; reviewable entities must provide robust context about the user approvals, for both human and further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a human and/or classification system. This information may include, for example, user(s) who approved the transaction, time of approval(s), location of approval(s), and device/key ID(s) that approved the transaction. This data can be fed into an internal Risk Analysis dashboard, and possibly other automated review systems.

In some embodiments, the Risk API requires human approval from one or more employees of the Cryptoasset Custodian if a transaction passes the manual and automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Examples of Physical Computing Environments

Figure 9:
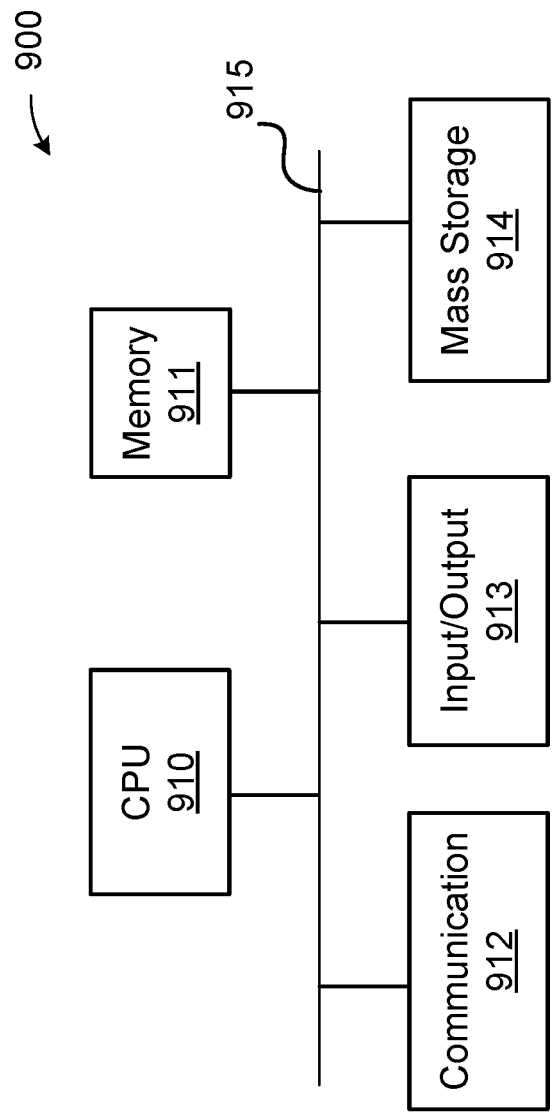
FIG. 9 is a block diagram showing an example of a hardware architecture of a processing system that can be used to implement some or all of the CCS or a user device.

FIG. 9 shows an example of a hardware architecture of a processing system that can be used to implement some or all of the CCS, or (separately) any user device, or both. The CCS can include one or more instances of an architecture such as shown in FIG. 9, where multiple such instances can be coupled to each other via one or more private networks.

The shown processing system 900 includes one or more processors, including a CPU 910, one or more memories 911 (at least a portion of which may be used as working memory, e.g., random access memory (RAM)), one or more data communication device(s) 912, one or more input/output (I/O) devices 913, and one or more mass storage devices 914, all coupled to each other through an interconnect 915. The interconnect 915 may be or include one or more conductive traces, buses, point-to-point connections, controllers, adapters and/or other conventional connection devices. Each processor 910 controls part of the operation of the processing device 900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 911 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 914 can be or include one or more hard drives, digital versatile disks (DVDs), flash memories, or the like. Each memory 911 and/or mass storage 914 can store (individually or collectively) data and instructions that configure the processor(s) 910 to execute operations to implement the techniques described above. Each communication device 912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 900, each I/O device 913 can be or include a device such as a display (which may include a transparent AR display surface), audio speaker, keyboard, mouse or other pointing device, microphone, camera, etc. Note, however, that such I/O devices may be unnecessary if the processing device 900 is embodied solely as a server computer.

In the case of a user device, a communication device 912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 912 can be or include, for example, any of the aforementioned types of communication devices, a wired Ethernet adapter, cable modem, DSL modem, or the like, or a combination of such devices.

Unless contrary to physical possibility, it is envisioned that (i) the methods/operations described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a computer-readable storage medium and may be executed by one or more general-purpose or special-purpose programmable microprocessors. A "computer-readable medium", as the term is used herein, includes any mechanism that can tangibly store information in a non-transitory form accessible by a machine (a machine may be, for example, a computer, network device, cellular phone, personal digital assistant (PDA), manufacturing tool, any device with one or more processors, etc.). For example, a computer-readable medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/operations described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   identifying, by one or more server computers of a cryptoasset custodial system, for a requested action, a private-keys group having an associated cryptographic group key,
   transmitting, by the one or more server computers, an encrypted private key associated with the requested action to a physical datacenter of the cryptoasset custodial system;
   decrypting, at the physical datacenter, a first level of encryption of the encrypted private key using the associated cryptographic group key;
   decrypting, at the physical datacenter, a second level of encryption of the encrypted private key using a hardware-based cryptographic key;
   authorizing, by the physical datacenter, the requested action by using the fully decrypted private key associated with the requested action in a process of digitally signing data, wherein the authorizing comprises:
      deriving an asymmetric cryptographic key pair for the cryptoasset from at least the fully decrypted private key;
      generating a blockchain address in accordance with the asymmetric cryptographic key pair for the cryptoasset; and
      digitally signing the blockchain address with the fully decrypted private key; and
   transmitting, by the physical datacenter, the digitally signed data to a computer to effect the requested action.

2. The method of claim 1, wherein the physical datacenter is one of a plurality of physical datacenters of the cryptoasset custodial system, and wherein each of the plurality of physical datacenters includes a corresponding first computer and a corresponding second computer.

3. The method of claim 2, wherein each first computer comprises a host computer for the corresponding second computer, and wherein each second computer within the plurality of physical datacenters is a hardware security module comprising at least one secure storage device and at least one physical computing device coupled with the at least one secure storage device.

4. The method of claim 1, wherein the physical datacenter includes a first computer and a second computer, and wherein decrypting the first level of encryption of the encrypted private key further comprises decrypting the first level of encryption at the first computer of the physical datacenter.

5. The method of claim 4, further comprising:
   subsequent to decrypting the first level of encryption at the first computer of the physical datacenter, transmitting, by the first computer within the physical datacenter, the partially decrypted private key to the second computer within the physical datacenter.

6. The method of claim 1, wherein the physical datacenter includes a first computer and a second computer, and wherein decrypting the second level of encryption of the encrypted private key further comprises decrypting the second level of encryption at the second computer within the physical datacenter.

7. The method of claim 1, wherein the physical datacenter includes a first computer and a second computer, and wherein authorizing the requested action by using the fully decrypted private key further comprises authorizing the requested action at the second computer within the physical datacenter.

8. The method of claim 1, wherein the physical datacenter includes a first computer and a second computer, and wherein transmitting the digitally signed data to the computer to effect the requested action further comprises transmitting the digitally signed data by the second computer within the physical datacenter.

9. The method of claim 1, wherein prior to identifying, by the one or more server computers, for the requested action, the private-keys group, the method further comprises:
   receiving, by the one or more server computers, a request to take the requested action in the cryptoasset custodial system.

10. The method of claim 1, wherein the requested action comprises a deposit of a cryptoasset into the cryptoasset custodial system.

11. The method of claim 1, further comprising assigning a private key to the private-keys group based at least in part on an amount of cryptoassets associated with the private-keys group managed by the cryptoasset custodial system.

12. The method of claim 11, wherein the private key assigned to the private-keys group is a root key for a customer of the cryptoasset custodial system.

13. The method of claim 11, further comprising reassigning the private key to a different private-keys group based at least in part on the amount of cryptoassets associated with the private-keys group.

14. The method of claim 1, further comprising assigning a private key to the private-keys group based on a customer or customer type, geographic distribution sets, a risk profile, usage pattern, or a combination thereof.

15. The method of claim 14, comprising:
   reassigning the private key to a different private-keys group based on the customer or customer type, the geographic distribution sets, the risk profile, the usage pattern, or the combination thereof;
   first-level decrypting the reassigned private key at a computer with access to a cryptographic group key for the private-keys group, and
   first-level encrypting the reassigned private key, without second-level decrypting the reassigned private key, at a computer with access to the cryptographic group key for the different private-keys group.

16. A cryptoasset custodial system comprising one or more processors configured to perform operations comprising:
   identifying, by one or more server computers of the cryptoasset custodial system, for a requested action, a private-keys group having an associated cryptographic group key;

transmitting, by the one or more server computers, an encrypted private key associated with the requested action to a physical datacenter of the cryptoasset custodial system;

decrypting, at the physical datacenter, a first level of encryption of the encrypted private key using the associated cryptographic group key;

decrypting, at the physical datacenter, a second level of encryption of the encrypted private key using a hardware-based cryptographic key;

authorizing, by the physical datacenter, the requested action by using the fully decrypted private key associated with the requested action in a process of digitally signing data, wherein the authorizing comprises:

deriving an asymmetric cryptographic key pair for the cryptoasset from at least the fully decrypted private key;

generating a blockchain address in accordance with the asymmetric cryptographic key pair for the cryptoasset; and digitally signing the blockchain address with the fully decrypted private key; and transmitting, by the physical datacenter, the digitally signed data to a computer to effect the requested action.

17. A non-transitory computer-readable medium storing computer-executable instructions which, when executed by one or more processors, cause the one or more processors to perform operations comprising:

identifying, by one or more server computers of a cryptoasset custodial system, for a requested action, a private-keys group having an associated cryptographic group key;

transmitting, by the one or more server computers, an encrypted private key associated with the requested action to a physical datacenter of the cryptoasset custodial system;

decrypting, at the physical datacenter, a first level of encryption of the encrypted private key using the associated cryptographic group key;

decrypting, at the physical datacenter, a second level of encryption of the encrypted private key using a hardware-based cryptographic key;

authorizing, by the physical datacenter, the requested action by using the fully decrypted private key associated with the requested action in a process of digitally signing data, wherein the authorizing comprises:

deriving an asymmetric cryptographic key pair for the cryptoasset from at least the fully decrypted private key;

generating a blockchain address in accordance with the asymmetric cryptographic key pair for the cryptoasset; and digitally signing the blockchain address with the fully decrypted private key; and transmitting, by the physical datacenter, the digitally signed data to a computer to effect the requested action.

\* \* \* \* \*